United States Patent
Hoshino et al.

(10) Patent No.: US 9,749,108 B2
(45) Date of Patent: Aug. 29, 2017

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Masayuki Hoshino, Kanagawa (JP); Takashi Tamura, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 450 days.

(21) Appl. No.: 14/369,428

(22) PCT Filed: Feb. 1, 2013

(86) PCT No.: PCT/JP2013/000552
§ 371 (c)(1),
(2) Date: Jun. 27, 2014

(87) PCT Pub. No.: WO2013/121728
PCT Pub. Date: Aug. 22, 2013

(65) Prior Publication Data
US 2015/0009922 A1 Jan. 8, 2015

(30) Foreign Application Priority Data
Feb. 16, 2012 (JP) ................................ 2012-031656

(51) Int. Cl.
*H04L 5/00* (2006.01)
*H04W 24/10* (2009.01)

(52) U.S. Cl.
CPC .......... *H04L 5/0053* (2013.01); *H04L 5/0035* (2013.01); *H04L 5/0057* (2013.01); *H04L 5/001* (2013.01); *H04L 5/0048* (2013.01); *H04L 5/0087* (2013.01); *H04L 5/0092* (2013.01); *H04W 24/10* (2013.01)

(58) Field of Classification Search
None
See application file for complete search history.

(56) References Cited

U.S. PATENT DOCUMENTS 8,842,610 B2 * 9/2014 Lee ...................... H04L 5/0048
370/328
8,964,663 B2 2/2015 Gaal et al.
(Continued)

FOREIGN PATENT DOCUMENTS

| JP | 2011-188126 A | 9/2011 |
|---|---|---|
| JP | 2012-147048 A | 8/2012 |
| WO | 2012/094215 A1 | 7/2012 |

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
(Continued)

*Primary Examiner* — Alex Skripnikov
(74) *Attorney, Agent, or Firm* — Seed IP Law Group LLP

(57) ABSTRACT

Provided is a terminal whereby the accuracy of CSI measurement results in the terminal can be assured, and declines in throughput prevented. In this terminal, a reception processor (203) receives reference signals respectively transmitted from a plurality of transmission points. A CSI generator (206) identifies a second subframe on the basis of a first subframe respectively established for each of the plurality of transmission points, and using the reference signals from the plurality of transmission points, generates channel information in a subframe other than the second subframe, without generating channel information in the second subframe. A transmission signal former (208) transmits the generated channel information.

15 Claims, 16 Drawing Sheets

(56) References Cited

U.S. PATENT DOCUMENTS

| | | |
|---|---|---|
| 9,467,271 B2 | 10/2016 | Nagata et al. |
| 2012/0201163 A1* | 8/2012 | Jongren ............... H04W 24/10 370/252 |
| 2013/0010707 A1 | 1/2013 | Gaal et al. |
| 2013/0294277 A1 | 11/2013 | Nagata et al. |
| 2016/0142195 A1 | 5/2016 | Nagata et al. |

OTHER PUBLICATIONS

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol specification (Release 10)," Dec. 2011, 296 pages.

International Search Report dated Apr. 16, 2013, for corresponding International Application No. PCT/JP2013/000552, 2 pages.

NTT Docomo, "Remaining Issue for CSI-RS Signaling," R1-106176, Agenda Item: 6.3.1, 3GPP TSG RAN WG1 Meeting #63, Jacksonville, USA, Nov. 15-19, 2010, 10 pages.

Samsung, "Discussions on CSI-RS port selection for non-uniform networks with low-power nodes," R1-111469, Agenda Item: 6.3.2.2, 3GPP TSG-RAN1#65 meeting, Barcelona, Spain, May 9-13, 2011, 3 pages.

TSG-RAN WG1, "LS on handling of collisions between CSI-RS and SIB," R1-106553, Work Item: LTE_eDL_MIMO-Core, 3GPP TSG-RAN1 Meeting #63, Jacksonville, USA, Nov. 15-19, 2010, 1 page.

\* cited by examiner

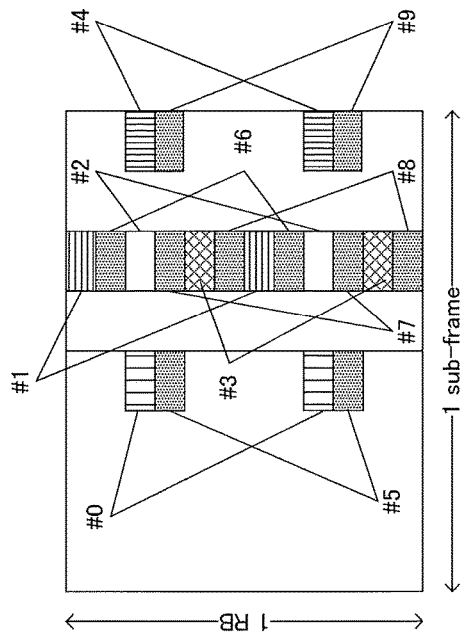
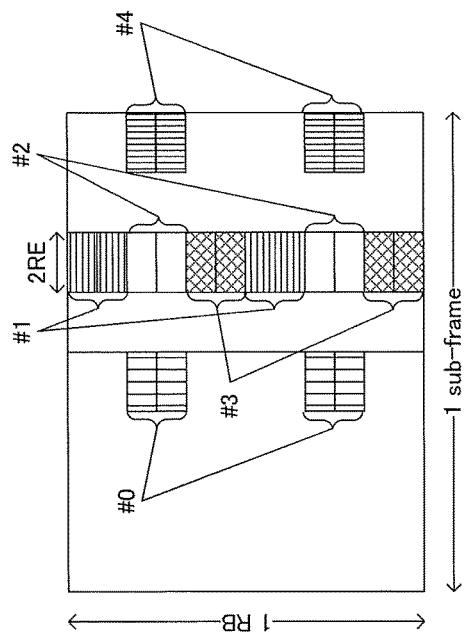
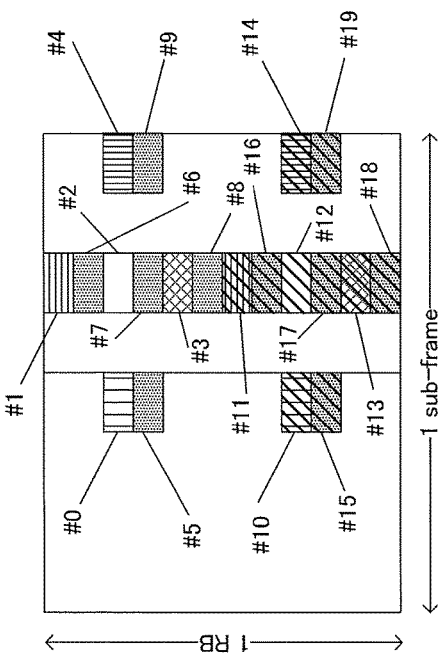
FIG. 2A (8 PORTS)
FIG. 2B (4 PORTS)
FIG. 2C (2 PORTS)

| | NORMAL | DROP PERIOD |
|---|---|---|
| PCell | S1/(I+N) | S1/(I+S3'+N) |
| TP CANDIDATE A | S2/(I+N) | S2/(I+S3'+N) |
| TP CANDIDATE B | S3/(I+N) | S3''/(I+N) |

FIG. 9

| $T_{11}$ | $T_{10}$ | $T_9$ | $T_8$ | $T_7$ | $T_6$ | $T_5$ | $T_4$ |
|---|---|---|---|---|---|---|---|
| $T_3$ | $T_2$ | $T_1$ | nB | | | | |

FIG. 15

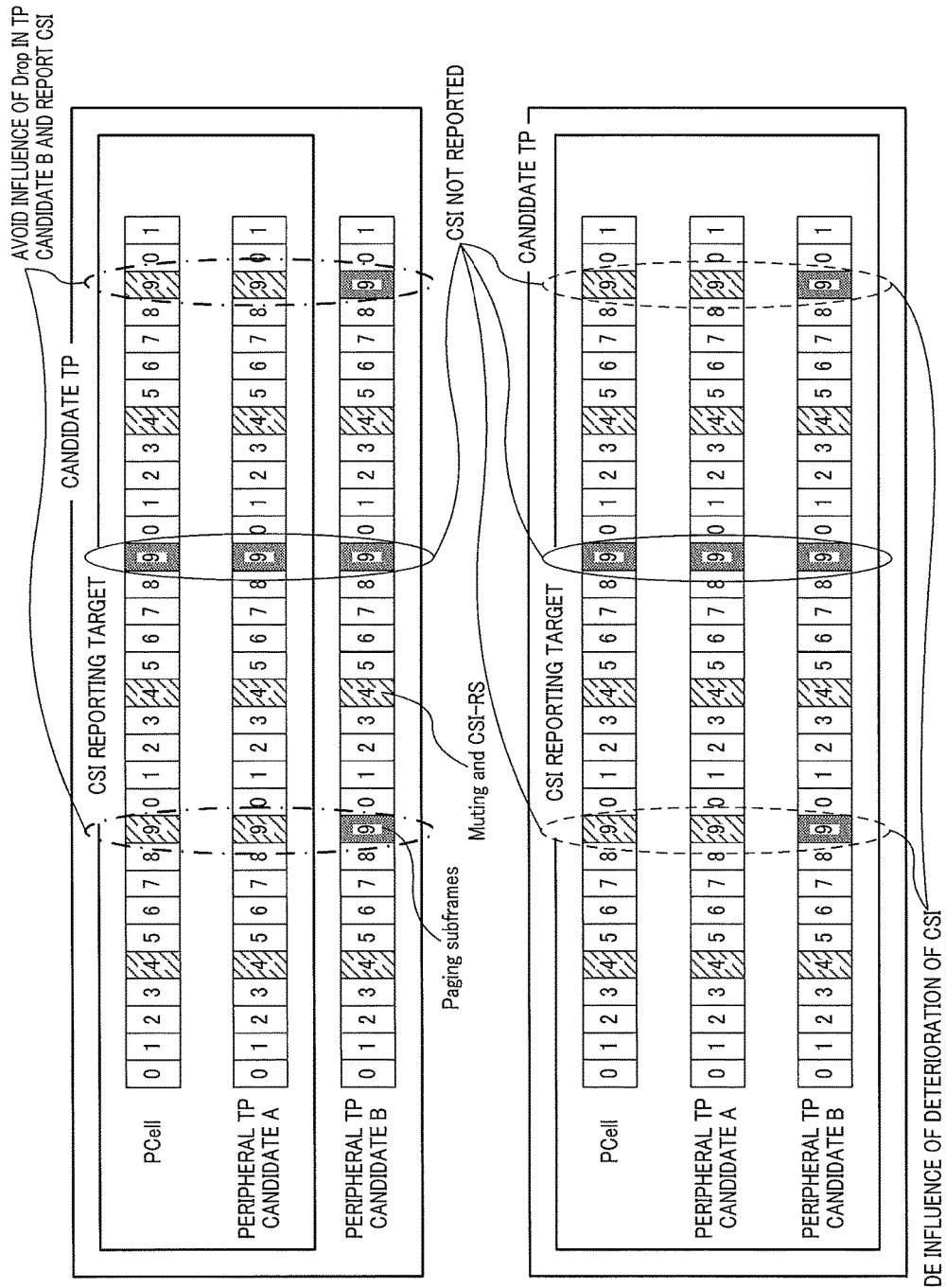

TERMINAL, BASE STATION, TRANSMISSION METHOD, AND RECEPTION METHOD

TECHNICAL FIELD

The present invention relates to a terminal, a base station, a transmission method and a reception method.

BACKGROUND ART

The 3rd Generation Partnership Project Radio Access Network Long Term Evolution (hereinafter, referred to as "LTE") and LTE-Advanced which is an evolved version of LTE (hereinafter, referred to as "LTE-A") employ orthogonal frequency division multiple access (OFDM) scheme for the downlink communication scheme.

For frequency scheduling and link adaptation in OFDMA, each terminal (which may also be called "UE (User Equipment)") measures channel information (CSI: channel state information) and reports the channel information (CSI measurement result) to a base station (which may also be called "eNB"). On the other hand, the base station performs appropriate resource allocation for the terminal using channel information (CSI measurement result).

In LTE, CSI is measured using a cell-specific reference signal (CRS). CRSs are transmitted in all subframes. The terminal can observe CRSs at points in time at which synchronization is established.

On the other hand, in LTE-A, CSI is measured using CSI-RSs (reference signals for channel quality measurement). Since LTE-A is a system which is an extended version of LTE while maintaining backward compatibility with LTE, CSI-RSs, which are LTE-A-specific reference signals, are arranged at a low density in both time and frequency domains so as to minimize insertion losses of CSI-RSs. For this reason, the terminal needs to acquire CSI-RS-related parameters as information broadcast in a cell (broadcast information) by the time CSI-RSs arranged at a low density are observed. As CSI-RS-related parameters, the number of transmitting antennas, positions of time/frequency resources in a subframe, transmission period, and subframe offset or the like are defined.

In LTE, there are two types of operation of CSI measurement and CSI reporting: operation of periodically reporting CSI (hereinafter referred to as "periodic CSI reporting") and operation of aperiodically reporting CSI (referred to as "aperiodic CSI reporting").

In periodic CSI reporting, the terminal performs CSI measurement according to one measurement operation indicated beforehand of a plurality of measurement operations in preparation for reporting using resources of a specified uplink (e.g., uplink control channel), maps the CSI measurement result to an uplink control channel and reports it to the base station. One example of the measurement operation is CSI reporting assuming closed-loop MIMO (multiple input multiple output) control. This CSI reporting adopts operation of measuring and reporting, for example, RI (rank indicator) indicating a spatial multiplex number, wideband desired precoding matrix (PMI: precoding matrix indicator), and wideband channel quality information (CQI: channel quality indicator).

In aperiodic CSI reporting as well as periodic CSI reporting, the terminal performs CSI measurement according to one measurement operation indicated beforehand. However, aperiodic CSI reporting is different from periodic CSI reporting in that a terminal reports CSI at a timing instructed from a base station and reports CSI using resources on a common data channel.

An example of the aforementioned method of indicating measurement operation beforehand is a method using a radio resource control message (RRC signaling). Aperiodic CSI reporting is instructed through assignment of an uplink data channel (e.g., PUSCH) using a downlink control channel (e.g., PDCCH).

Different measurement operations may also be indicated between periodic CSI reporting and aperiodic CSI reporting. For example, in periodic CSI reporting, RI, wideband PMI and wideband CQI are reported as described above, whereas in aperiodic CSI reporting, RI, wideband PMI and narrow band CQI can be reported. That is, in aperiodic CSI reporting, narrow band CSI is reported instead of wideband CQI in periodic CSI reporting. In this case, periodic CSI reporting is used for rough link adaptation in which periodic CSI reporting is referenced at the time of non-urgent data transmission, and aperiodic CSI reporting is used for detailed link adaptation in which aperiodic CSI reporting is referenced at the time of urgent data transmission, thus allowing an operation in which the two types of CSI reporting are used for different applications.

In LTE-A, an operation to report two types of measurement targets indicated beforehand through periodic CSI reporting has been added. In LTE-A, another operation has been added whereby two types of measurement targets indicated beforehand in aperiodic CSI reporting are also associated with timings instructed from the base station and reporting corresponding to one of the two types of measurement targets is performed at each timing. The two types of measurement targets are indicated using a bitmap corresponding to 40 consecutive subframes using RRC signaling.

In LTE-A, a concept of carrier aggregation is introduced, which extends the number of bits for indicating aperiodic CSI reporting to two, and can adopt operation of measuring and reporting two types of component carrier groups indicated beforehand in addition to the operation of measuring and reporting component carriers instructed to be reported.

In LTE-A, the introduction of coordinated multiple transmission point (CoMP) is under study. CoMP is a technique whereby a plurality of base stations (cells or transmission points (TP)) cooperate with each other to transmit signals to a terminal (UE) and several schemes are under study. For example, there are two main CoMP schemes under study in 3GPP: (1) CB (coordinated beamforming) scheme and (2) JT (Joint Transmission) scheme.

The CB scheme is a scheme in which only a specific TP stores data intended for a certain terminal. That is, a signal from a TP that stores no data intended for the terminal (e.g., TP adjacent to a TP to which the terminal is connected) is regarded as interference to the terminal. The CB scheme adopts a method of reducing inter-TP interference through control of transmission parameters. More specifically, examples of transmission parameters include precoding, transmission power, modulation scheme and coding rate. By appropriately controlling these transmission parameters, it is possible to weaken signals from an interference TP (TP that possesses no data intended for the terminal) for the terminal while strengthening signals from a desired TP (TP that possesses data intended for the terminal). Strengthening signals from a desired TP and weakening signals from an interference TP can contradict each other depending on the situation, but various proposals are being made taking into account the trade-off between the two.

On the other hand, the JT scheme is a scheme in which data to a certain terminal is shared by a plurality of TPs. Thus, a plurality of TPs can simultaneously transmit signals intended for the corresponding terminal. For this reason, since the terminal can handle signals from other TPs not as interference signals but as desired signals, an SINR observed at the terminal can be expected to improve. Furthermore, improving a method of generating precoding weights at a plurality of TPs as an operation within a network allows a large performance improvement to be achieved.

For such CoMP control, there is a method of observing channel information between each TP and the terminal to be targets of CoMP control and reporting the channel information to the network as channel information in units of TPs.

There is also a heterogeneous network (HetNet) using a plurality of base stations with different scales of coverage areas. The heterogeneous network is a network combining a macro base station that provides a large coverage area (which may also be referred to as "macro cell," HPN (high power node)" or "macro eNB") and a pico base station that provides a small coverage area (may also be referred to as "pico cell," "LPN (low power node)" or "pico eNB"). Regarding the heterogeneous network, studies are being carried out on a method of easily realizing mobility control (handover) using signals in the physical layer by assigning to a pico cell arranged within the coverage area of the macro cell, the same identification number (cell ID) as that of a macro cell. For operation of such a heterogeneous network, a method is under study which uses reference signals for channel quality measurement (CSI-RSs) newly added for an LTE-A compliant terminal (hereinafter referred to as "LTE-A terminal") to report channel information (CSI) measured by the LTE-A terminal to a network and selects an optimum transmission/reception point according to the propagation situation (e.g., see FIG. 1 and NPL 1).

Moreover, application of CoMP to a heterogeneous network is also under study. For example, by applying CoMP such as CB scheme or JT scheme between LPN1 and macro eNB shown in FIG. 1, receiving quality in the terminal can be expected to improve.

CSI-RSs are used for CSI measurement or reporting during CoMP control. FIGS. 2A to 2C illustrate configuration examples of CSI-RSs with respective numbers of transmitting antenna ports. As shown in FIGS. 2A to 2C, CSI-RSs are each defined by a configuration corresponding to the number of transmitting antenna ports (8 ports, 4 ports or 2 ports) of the base station. In FIGS. 2A to 2C, one RB (resource block) is configured of 12 subcarriers and each block shown in FIGS. 2A to 2C represents resources of two OFDM symbols in each subcarrier that are continuous in a time domain (2 REs (Resource Elements)). In each block (2 REs) shown in FIGS. 2A to 2C, CSI-RSs corresponding to two ports are code-multiplexed.

Each terminal acquires information relating to CSI-RS from the base station beforehand. More specifically, the information relating to CSI-RS is, for example, the number of antenna ports (antennaPortsCount), subcarriers within a subframe, and CSI-RS configuration number that identifies an OFDM symbol position (resourceConfig, hereinafter may be represented by "CSI-RS config(i)" or "#i," CSI-RS config(0) to (19) in FIGS. 2A to 2C), transmission subframe configured of a transmission period and an offset (subframe-Config), and a power ratio (p-C) between reference signals and data signals (see NPLs 2 and 3).

In FIGS. 2A to 2C, CSI-RS configuration numbers are assigned in order in the time direction and in order in the frequency direction at the same point of time. Moreover, as shown in FIGS. 2A to 2C, the same number is assigned to resource starting positions of the respective CSI-RS configuration numbers (starting positions in order of number assignment) between CSI-RS configurations corresponding to the respective numbers of antenna ports. As shown in FIGS. 2A to 2C, a CSI-RS configuration when the number of antenna ports is small constitutes a subset of a CSI-RS configuration when the number of antenna ports is large (may also be called "(nested structure"). It is thereby possible to identify all the respective resources for the respective numbers of antenna ports with a minimum necessary number of numbers while using overlapping numbers in the CSI-RS configuration corresponding to the respective numbers of antenna ports. For example, CSI-RS config(0) with two ports shown in FIG. 2C can be identified as only resources corresponding to two ports (2 REs) from the starting position of CSI-RS config(0) with eight ports (8 REs) shown in FIG. 2A.

Note that a procedure for a base station to indicate, to a terminal, information relating to CSI-RS of each TP beforehand is adopted to observe channel information between each TP to be controlled for CoMP control (hereinafter represented by "coordinating TP" or may also be called "CoMP measurement set").

There is also a muting technique that makes data of the TP to which the terminal is connected a non-transmission signal in order for the terminal to observe reference signals (CSI-RSs) transmitted from peripheral TPs. More specifically, each of CSI-RS configs (0) to (9) (see FIG. 2B) which are 4-port CSI-RS configuration numbers of the aforementioned CSI-RS configuration numbers is expressed in a bitmap, and the base station indicates to the terminal as to which resource is designated as a non-transmission signal resource. The information on the bitmap type indicating which resource is designated as a non-transmission signal resource is called "non-transmission CSI-RS configuration number list" (zeroTxPowerResourceConfigList) (see NPL 3).

For example, when resources of CSI-RS configs (1) and (2) of CSI-RS configs (0) to (9) are designated as non-transmission signal resources, the non-transmission CSI-RS configuration number list becomes {0, 1, 1, 0, 0, 0, 0, 0, 0, 0}. Here, "1" represents a non-transmission signal resource and "0" represents a resource other than a non-transmission signal resource in correspondence with CSI-RS configs (0) to (9) respectively in order from the leading bit of the non-transmission CSI-RS configuration number list.

The base station indicates, to the terminal, a transmission subframe as well (zeroTxPowerSubframeConfig) configured of a transmission period and an offset like the aforementioned CSI-RS as a subframe in which a non-transmission signal resource is configured. This allows the terminal to identify which resource in which subframe becomes a non-transmission signal resource.

FIG. 3 illustrates positions of non-transmission signal resources (CSI-RS configs (1) and (2)) within a subframe corresponding to zeroTxPowerSubframeConfig configured in a TP to which a certain terminal is connected. In this case, by causing the CSI-RS configuration of a TP positioned in the periphery of the TP to associate with any one of non-transmission signal resources (CSI-RS config(1) or (2) in FIG. 3), the terminal receives no more interference from data from the TP to which the terminal is connected and can secure CSI measuring accuracy when observing CSI-RSs of the peripheral TP as desired signals.

Note that since both CSI-RS transmission and muting are necessary for channel quality measurement of the entire system band, both techniques are applied to the entire system band. More specifically, CSI-RS and muting are applied to all RBs in the system band. On the other hand, since CSI-RS transmission and muting are techniques added for LTE-A, a terminal compliant with only LTE (hereinafter referred to as "LTE terminal") cannot detect CSI-RS and muting. In order to avoid influences of demodulation performance deterioration of a received signal generated because an LTE terminal cannot detect CSI-RS and muting, an operation (hereinafter described as "Drop") is defined which does not apply CSI-RS transmission and muting in specific subframes. Specific subframes in which Drop is defined are roughly divided into the following three subframes.

(1) Uplink/downlink pilot signal transmission slot in TDD (time division duplexing) system (TDD (FS type2) special subframe)

(2) Subframe in which CSI-RS transmission causes collision with synchronization signal, PBCH (physical broadcast channel), SIB1 (system information block type 1)

(3) Subframe configured for paging by base station (hereinafter referred to as "paging subframe")

FIG. 4 illustrates an example of subframes in which synchronization signal (PSS (primary synchronization signal) and SSS (secondary synchronization signal)), PBCH and SIB1 are arranged according to FDD (frequency division duplexing) and TDD.

FIG. 5 illustrates a configuration example of paging subframes according to FDD and FIG. 6 illustrates a setting example of paging subframes according to TDD. In FIG. 5 and FIG. 6, for example, when set value "nB" is oneT, one paging subframe is set for every 10 ms (10 subframes) (10-ms period). Similarly, when "nB" is halfT, one paging subframe is set for every 20 ms (20 subframes) (20-ms period). The same applies to other "nBs." Thus, a period (frequency) with which a paging subframe is set, that is, a paging transmission frequency is determined in accordance with set value "nB."

CITATION LIST

Non-Patent Literature

NPL 1
3GPP TSG RAN WG1 meeting, R1-111469, Samsung, "Discussions on CSI-RS port selection for non-uniform networks with low-power nodes", May 2011
NPL 2
3GPP TS 36.211 v10.4.0, Section 6.10.5, "3GPP TSG RAN E-UTRA Physical Channels and Modulation (Release 10)"
NPL 3
3GPP TS 36.331 v10.4.0, Section 6.3.2, "3GPP TSG RAN E-UTRA Radio Resource Control (RRC); Protocol specification (Release 10)"

SUMMARY OF INVENTION

Technical Problem

Simply combining mobility control and CoMP control in the aforementioned physical layer leads to the following problems in channel information reporting.

When a mobility range of a terminal in an idle state is taken into consideration, it is necessary to secure more resource regions used for paging in a macro cell than in a pico cell. For this reason, in a macro cell, an operation with more paging subframes (higher paging transmission frequency) configured than in a pico cell is predicated.

However, the terminal receives paging subframe setting information (hereinafter referred to as "paging subframe information") only from the base station from which a control signal is indicated (hereinafter referred to as "PCell"). For this reason, the terminal operates without knowing paging subframe information of cells other than PCell (e.g., peripheral TP). That is, since the terminal is not aware of Drop in the peripheral TP, measuring accuracy during CSI measurement of a plurality of TPs including the peripheral TP for CoMP control deteriorates.

Specific examples of operation whereby CSI measuring accuracy deteriorates will be described with reference to FIG. 7 to FIG. 9.

Here, as shown in FIG. 7, a case will be described where a TP candidate corresponding to PCell (that is, a cell in which a terminal receives a control signal), peripheral TP candidate A and peripheral TP candidate B which are located around the PCell are designated as cells that can be CoMP control targets (hereinafter referred to as "TP candidates"). Note that a TP candidate corresponding to PCell and peripheral TP candidate A are assumed to be pico cells and peripheral TP candidate B is assumed to be a macro cell. As shown in FIG. 8, an assumption is made that CSI-RS transmission and muting are applied in subframes #4 and #9 (5-ms period) for each TP candidate.

A 20-ms period (corresponding to nB=halfT shown in FIG. 5) is indicated to the terminal as paging subframe information of PCell. Moreover, for peripheral TP candidate B (macro cell), 10-ms period (corresponding to nB=oneT shown in FIG. 5) which is a higher frequency than PCell is configured as a paging subframe. In this case, as shown in FIG. 8, a situation occurs in which only peripheral TP candidate B (macro cell) among three TP candidates becomes a paging subframe (subframe #9). However, the terminal shown in FIG. 7 is aware of only the paging subframe of PCell and is not aware of paging subframes of peripheral TP candidate A and peripheral TP candidate B.

For example, in subframe #4 shown in FIG. 8, when the terminal measures CSI for a TP candidate corresponding to PCell, the terminal applies muting to peripheral TP candidate A and peripheral TP candidate B. Thus, the terminal can receive CSI-RS from the TP candidate corresponding to PCell without receiving interference from other TP candidates. Therefore, as shown in FIG. 9 (normal period), there are obtained a desired signal component (S1) calculated using CSI-RS transmitted from the TP candidate corresponding to PCell and a CSI measurement result (e.g., SINR (signal to interference and noise ratio), (S1/(I+N))) using an interference/noise component (I+N) obtained from signal components other than the signal component of the TP candidate. The same applies to a CSI measurement result corresponding to peripheral TP candidate A (S2/(I+N)) and CSI measurement result corresponding to peripheral TP candidate B (S3/(I+N)) shown in FIG. 7.

On the other hand, in subframe #9 shown in FIG. 8, although muting is applied to peripheral TP candidate A, Drop occurs in peripheral TP candidate B, and therefore peripheral TP candidate B transmits paging or a data signal or the like even on resources on which other TPs (e.g., TP candidates corresponding to PCell) transmit CSI-RS without designating those resources as non-signal transmission. Thus, when the terminal measures CSI corresponding to a TP candidate corresponding to PCell in subframe #9 shown in FIG. 8, a signal from peripheral TP candidate B causes interference to CSI-RS transmitted from the TP candidate corresponding to PCell in the terminal.

Thus, as shown in FIG. 9 (Drop period), the terminal obtains a CSI measurement result (S1/(I+S3'+N)) with a signal component (S3') transmitted from peripheral TP candidate B mixed with the TP candidate corresponding to PCell. The same applies to the CSI measurement result (S2/(I+S3'+N)) corresponding to peripheral TP candidate A shown in FIG. 7. When measuring CSI corresponding to peripheral TP candidate B in subframe #9 shown in FIG. 8, the terminal obtains a desired signal component (S3") calculated using a signal component which is not CSI-RS. For this reason, the terminal obtains a CSI measurement result (S3"/(I+N)) which is different from the CSI measurement result (S3/(I+N)) estimated through normal operation for peripheral TP candidate B.

As described above, since muting is not applied to peripheral TPs during Drop, a signal (paging or data signal) transmitted from the peripheral TP causes interference to CSI-RS transmitted from the CSI measurement target TP (that is, CSI-RSs are not orthogonal to each other) and CSI measuring accuracy deteriorates in the terminal. During Drop, since CSI-RS transmission is not applied to the peripheral TP, if the peripheral TP is a CSI measurement target, the terminal measures a desired signal component using a received signal (data signal) at the resource position of CSI-RS actually not transmitted due to Drop, and therefore the CSI measuring accuracy deteriorates. As described above, the accuracy of the CSI measurement result obtained in the terminal cannot be secured, so that CoMP control cannot be appropriately performed, which in turn, causes deterioration of throughput.

An object of the present invention is to provide a terminal, a base station, a transmission method and a reception method capable of securing accuracy of a CSI measurement result in a terminal and preventing deterioration of throughput.

Solution to Problem

A terminal according to an aspect of the present invention includes: a receiving section that receives reference signals transmitted from a plurality of transmission points, respectively; a generating section that identifies, based on first subframes configured respectively for the plurality of transmission points, a second subframe, that generates channel information using the reference signals of the plurality of transmission points in a subframe other than the second subframe, and that does not generate the channel information in the second subframe; and a transmitting section that transmits the generated channel information.

A base station according to an aspect of the present invention includes: a configuration section that configures a plurality of transmission points for a terminal; and a receiving section that identifies, based on first subframes configured for the plurality of transmission points respectively, a second subframe, that receives channel information of the plurality of transmission points in a subframe other than the second subframe, and that does not receive the channel information in the second subframe.

A transmission method according to an aspect of the present invention includes: receiving reference signals transmitted from a plurality of transmission points respectively; identifying, based on first subframes configured for the plurality of transmission points, respectively, a second subframe, generating channel information using the reference signals of the plurality of transmission points in a subframe other than the second subframe, and not generating the channel information in the second subframe; and transmitting the generated channel information.

A reception method according to an aspect of the present invention includes: configuring a plurality of transmission points for a terminal; and identifying, based on first subframes configured for the plurality of transmission points respectively, a second subframe, receiving channel information of the plurality of transmission points in a subframe other than the second subframe, and not receiving the channel information in the second subframe.

Advantageous Effects of Invention

According to the present invention, it is possible to secure accuracy of a CSI measurement result in a terminal and prevent deterioration of throughput.

BRIEF DESCRIPTION OF DRAWINGS

FIGS. 2A to 2C illustrate a CSI-RS configuration;

FIG. 9 illustrates channel information of each TP candidate;

FIG. 15 illustrates an example of notification of part of TP information and paging subframe information according to Embodiment 2 of the present invention;

FIG. 17 is a diagram provided for describing CSI reporting according to Embodiment 2 of the present invention.

DESCRIPTION OF EMBODIMENTS

Figure 1:
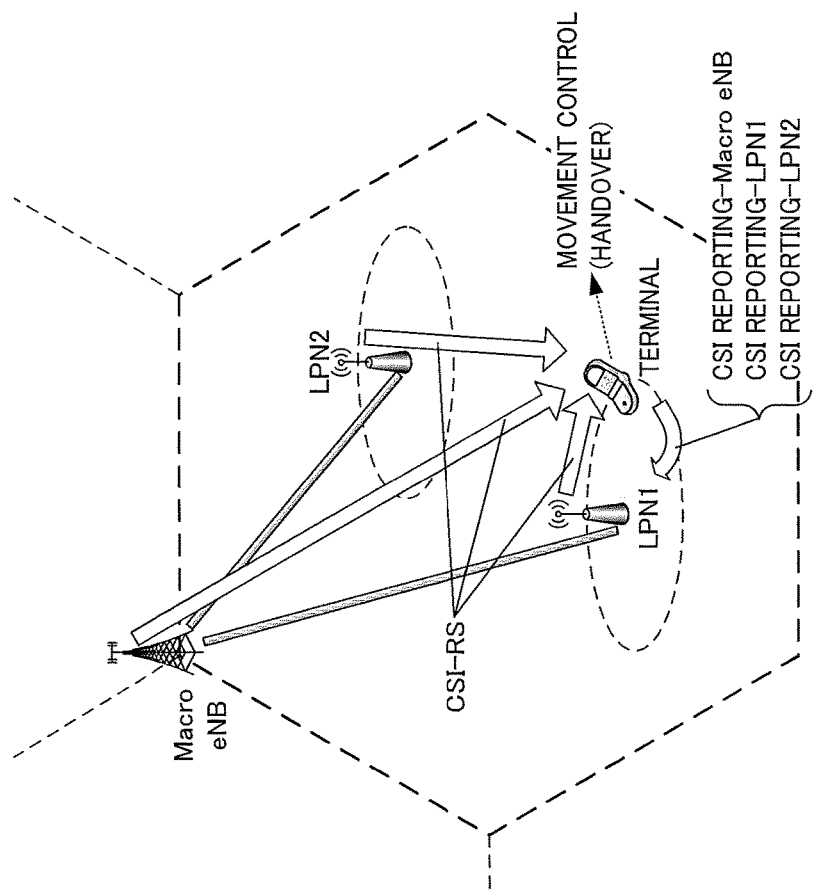
FIG. 1 illustrates CSI reporting when CoMP is applied in HetNet.
Figure 3:
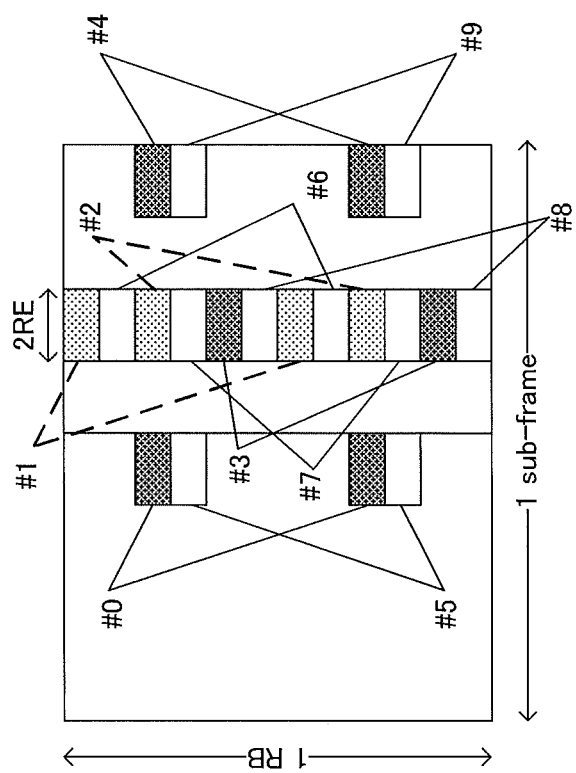
FIG. 3 illustrates a configuration example of non-transmission signal resources.
Figure 4:
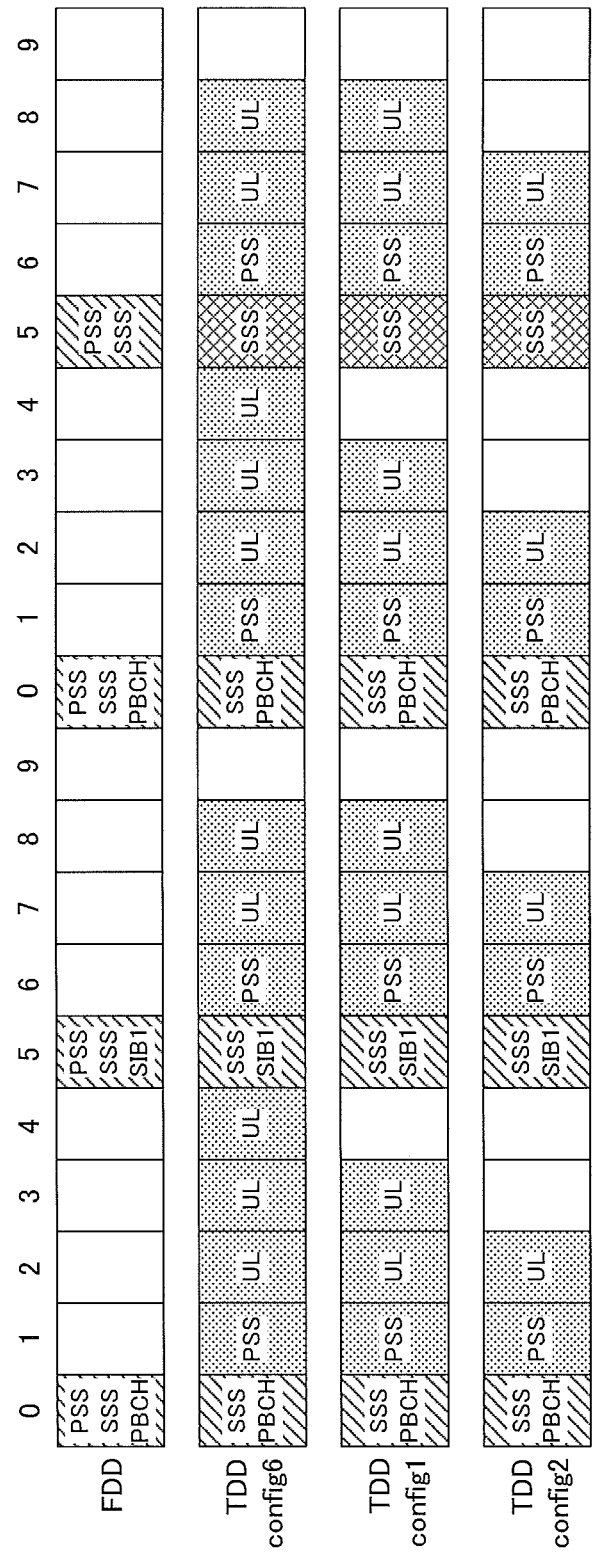
FIG. 4 illustrates a configuration example of a synchronization signal, PBCH and SIB1.

Hereinafter, embodiments of the present invention will be described in detail with reference to the drawings. Throughout the embodiments, the same elements are assigned the same reference numerals and any duplicate description of the elements is omitted.

[Embodiment 1]
[Overview of Communication System]

A communication system according to Embodiment 1 of the present invention includes base station 100 and terminals 200. Base station 100 is an LTE-A compliant base station and terminals 200 are LTE-A compliant terminals.

Figure 10:
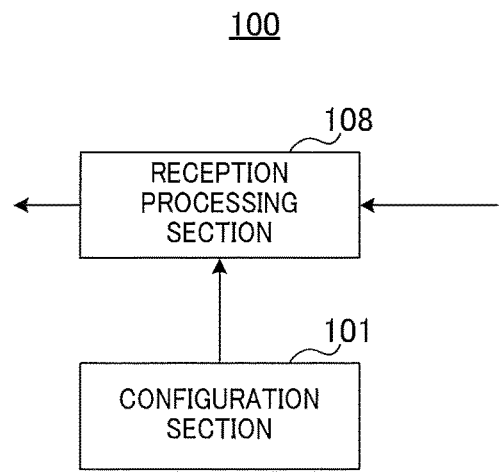
FIG. 10 is a block diagram illustrating a main configuration of a base station according to Embodiment 1 of the present invention.

FIG. 10 is a main configuration diagram of base station 100 according to Embodiment 1 of the present invention. In base station 100, configuration section 101 configures a plurality of TPs for terminal 200 and reception processing section 108 receives CSI (channel information) of a plurality of TPs in subframes other than a subframe (second subframe) identified based on a paging subframe (first subframe) configured for each of a plurality of TPs but does not receive CSI in the identified subframe.

Figure 11:
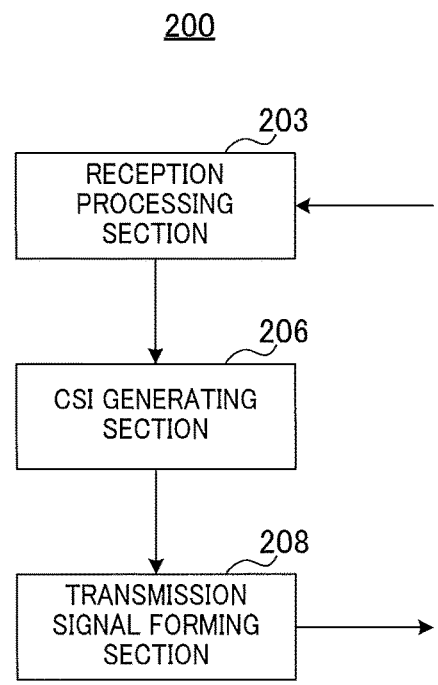
FIG. 11 is a block diagram illustrating a main configuration of a terminal according to Embodiment 1 of the present invention.

FIG. 11 is a main configuration diagram of terminal 200 according to Embodiment 1 of the present invention. In terminal 200, reception processing section 203 receives CSI-RSs (reference signals) transmitted from a plurality of TPs respectively and CSI generating section 206 generates CSI (channel information) using CSI-RSs of the plurality of TPs in subframes other than a subframe (second subframe) identified based on the paging subframe (first subframe) configured for each of the plurality of TPs, but does not generate CSI in the identified subframe, and signal forming section 208 transmits the generated CSI.

An FDD (Frequency Division Duplex) system in which uplink and downlink are frequency-divided will be described as a premise below. However, without being limited to this, a configuration may also be adopted where terminal 200 reports channel information to base station 100 in a TDD (Time Division Duplex) system in which uplink and downlink are time-divided.

A configuration will be described as an example below where two TPs are formed of single base station 100. However, without being limited to this, a configuration may also be adopted in which each TP is formed of a plurality of base stations 100 and signals are shared appropriately such that both TPs are operated in coordination.

Figure 12:
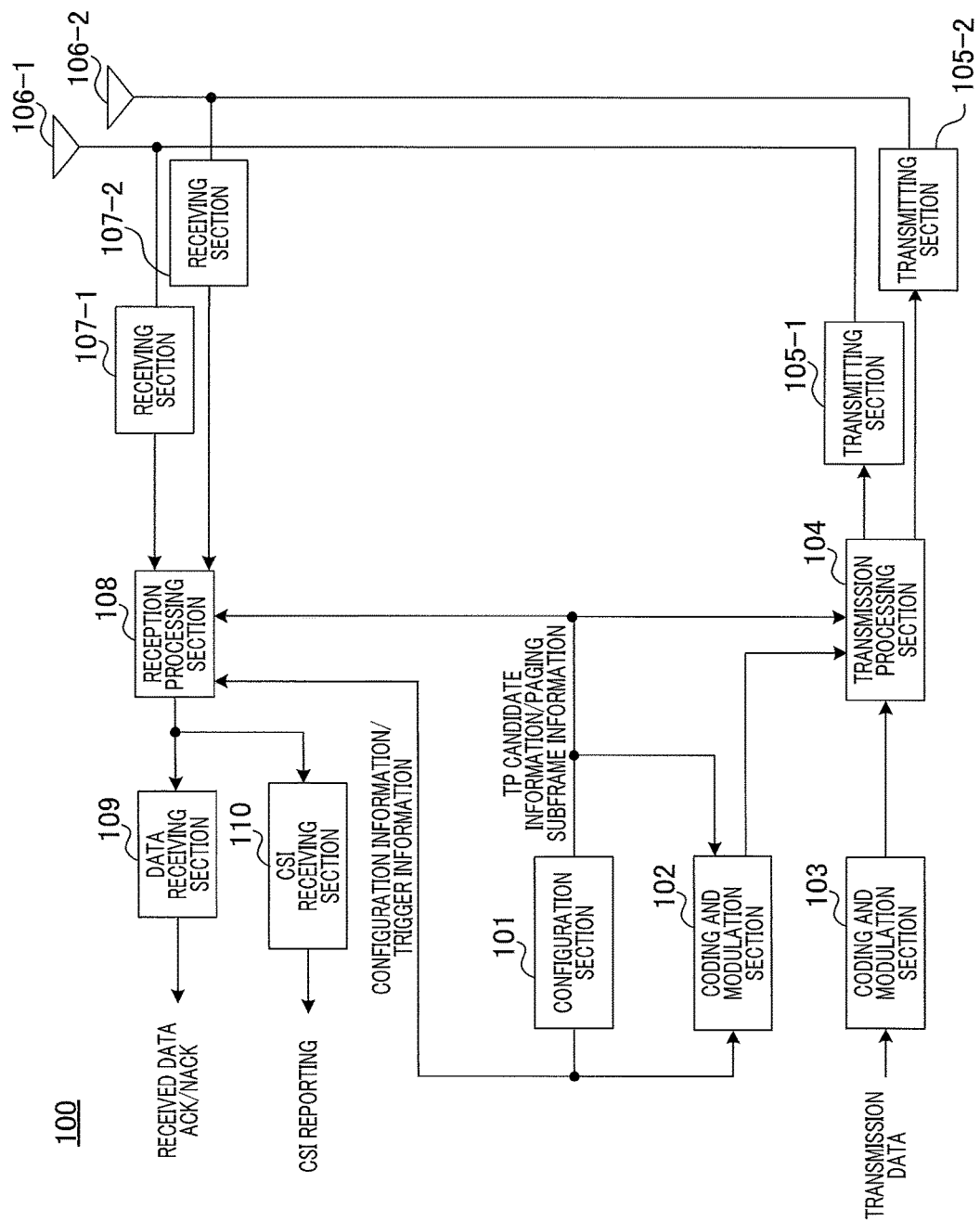
FIG. 12 is a block diagram illustrating a configuration of the base station according to Embodiment 1 of the present invention.

[Configuration of Base Station 100] FIG. 12 is a block diagram illustrating a configuration of base station 100 according to Embodiment 1 of the present invention. In FIG. 12, base station 100 includes configuration section 101, coding/modulation sections 102 and 103, transmission processing section 104, transmitting sections 105-1 and 105-2, antennas 106-1 and 106-2, receiving sections 107-1 and 107-2, reception processing section 108, data receiving section 109, and CSI receiving section 110.

Configuration section 101 generates "TP candidate information" as control information indicating to CSI reporting target temiinal 200 a plurality of transmission points (TPs) that can be candidates to which CSI reporting target terminal 200 may be connected. The TP candidate information includes for each transmission point, parameters such as the number of antennas, resource positions, transmission timings of reference signals as information, relating to transmission points (TPs) that may be candidates for mobility control. That is, configuration section 101 configures parameters necessary to measure channel information (CSI) using signals from respective TPs for CSI reporting target terminal 200.

Configuration section 101 generates for each TP, paging subframe information indicating the configuration of a paging subframe (subframe in which paging is transmitted) for each TP included in the TP candidate information for CSI reporting target terminal 200.

As described above, the TP candidate information and the paging subframe information for each TP generated by configuration section 101 are subjected to transmission processing in coding and modulation section 102, transmission processing section 104, and then transmitting section 105 as control information and then transmitted to CSI reporting target terminal 200. Information of radio resource control (RRC signaling) can be used as control information to indicate the TP candidate information and paging subframe information.

Configuration section 101 transmits the TP candidate information and paging subframe information to CSI reporting target terminal 200 via coding and modulation section 102 and outputs the information to reception processing section 108.

Configuration section 101 indicates, to terminal 200 to be a mobility control target in the physical layer in the aforementioned heterogeneous network to measure and report the channel information of the downlink (hereinafter, described as "downlink CSI reporting" or may also be called "downlink CSI feedback") for a channel of each downlink between a plurality of transmission/reception points (a plurality of cells) and the terminal. This indication (i.e. request for reporting downlink CSI) is indicated as higher layer information. This downlink CSI reporting can also be performed at a periodic timing or at an optional timing (aperiodically) based on trigger information. It should be noted that the trigger information is included in a downlink control channel (PDCCH: Physical Downlink Control Channel), for example. CSI reporting performed at a periodic timing is included in an uplink control channel (PUCCH: Physical Uplink Control Channel) separately configured in the CSI reporting target terminal.

Configuration section 101 generates assignment control information including resources (RB) allocation information and MCS (Modulation and Coding Scheme) information for one or a plurality of transport blocks (TBs). The assignment control information includes assignment control information relating to an uplink resource (e.g., PUSCH) to which uplink data is assigned and assignment control information relating to a downlink resource (e.g., PUSCH (Physical Downlink Shared Channel) to which downlink data is assigned. The assignment control information is outputted to transmission processing section 104 and reception processing section 108 and also indicated from base station 100 to terminal 200 by a PDCCH.

Coding and modulation section 102 encodes and modulates configuration information, trigger information and assignment control information received from configuration section 101 and outputs the modulated signal obtained to transmission processing section 104.

Coding and modulation section 103 encodes and modulates an inputted data signal (transmission data) and outputs the modulated signal obtained to transmission processing section 104.

Transmission processing section 104 forms transmission signals by mapping the modulated signals to be received from coding and modulation sections 102 and 103 to the resources indicated by the downlink resource assignment information received from configuration section 101. In a case where the transmission signals are OFDM signals, OFDM signals are formed by mapping the modulated signals to the resources indicated by the downlink resource assignment information to be received from configuration section 101, transforming the mapped signals into a time waveform by inverse fast Fourier transform (IFFT), and adding cyclic prefix (CP) to the resultant signals.

Transmitting section 105-1 or 105-2 performs radio transmission processing (e.g., up-conversion, digital to analog (D/A) conversion, and/or the like) on the transmission signals received from transmission processing section 104 and transmits the resultant signals via antenna 106-1 or 106-2.

Receiving sections 107-1 and 107-2 perform radio reception processing (e.g., down-conversion, analog to digital (A/D) conversion, and/or the like) on the radio signals received via antenna 106-1 or 106-2 and outputs the obtained received signals to reception processing section 108.

Regarding the transmitting/receiving sections and antennas provided in plurality, for example, an operation may be possible in which transmitting section 105-1, receiving section 107-1 and antenna 106-1 are used to form a macro cell and transmitting section 105-2, receiving section 107-2 and antenna 106-2 are used to form a pico cell.

Reception processing section 108 identifies the resources to which the uplink data signals and ACK/NACK information are mapped, on the basis of the uplink resource assignment information received from configuration section 101 and extracts a signal component mapped to the identified resources from the received signals.

Reception processing section 108 identifies resources to which CSI reports are mapped based on the configuration information including TP candidate information and paging subframe information of each TP received from configuration section 101 and trigger information, and extracts signal components mapped to the identified resources from the received signals. More specifically, reception processing section 108 determines that no CSI report is transmitted from terminal 200 in the paging subframe indicated in the paging subframe information corresponding to the TP candidate included in the TP candidate information and does not perform reception processing on the CSI reports. On the other hand, reception processing section 108 receives the CSI report using the above identified resources shown below in subframes other than the paging subframe indicated in the paging subframe information corresponding to the TP candidate included in the TP candidate information. For periodic CSI reporting, reception processing section 108 receives the CSI reports using the above identified resources in a defined subframe. On the other hand, for aperiodic CSI reporting, reception processing section 108 receives the CSI reports using the identified resources in a subframe located at the fourth subframe from the subframe in which trigger information is transmitted.

That is, reception processing section 108 identifies a subframe in which CSI is not reported from terminal 200 based on paging subframe information for each TP (paging subframe configured for each of a plurality of TPs). Reception processing section 108 then receives CSI of the plurality of TPs in subframes other than the identified subframe and does not receive CSI in the identified subframe.

In a case where the received signals are spatially multiplexed signals (i.e., multi-codeword (CW) transmission), reception processing section 108 demultiplexes the signals for each CW. In addition, in a case where the received signals are OFDM signals, reception processing section 108 performs an inverse discrete Fourier transform (IDFT) on the extracted signal component to transform the OFDM signals into time-domain signals.

The uplink data signals (received data) and ACK/NACK information extracted by reception processing section 108 as described above are outputted to data receiving section 109 while the CSI is outputted to CSI receiving section 110.

Data receiving section 109 decodes the signals received from reception processing section 108. The uplink data and ACK/NACK information are thus obtained.

CSI receiving section 110 demodulates the signals received from reception processing section 108. The CSI is thus obtained. Base station 100 performs scheduling and link adaptation and CoMP control based on the CSI of each received transmission point.

[Configuration of Terminal 200]

Figure 13:
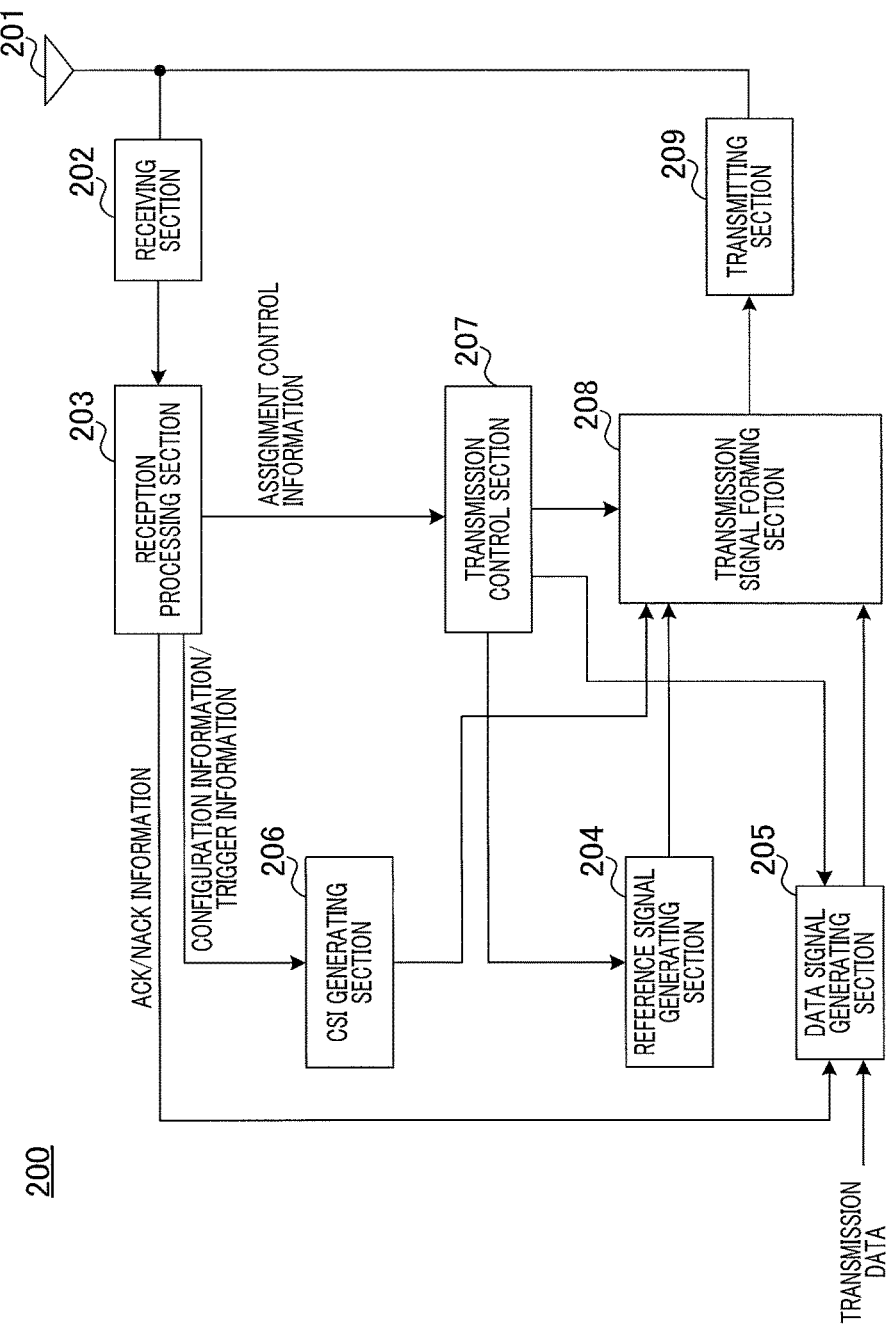
FIG. 13 is a block diagram illustrating a configuration of the terminal according to Embodiment 1 of the present invention.

FIG. 13 is a block diagram illustrating the configuration of terminal 200 according to Embodiment 1 of the present invention. Terminal 200 herein is an LTE-A compliant terminal.

In FIG. 13, terminal 200 includes antenna 201, receiving section 202, reception processing section 203, reference signal generating section 204, data signal generating section 205, CSI generating section 206, transmission control section 207, transmission signal forming section 208 and transmitting section 209.

Receiving section 202 performs radio reception processing (e.g., down-conversion, analog to digital (A/D) conversion, and/or the like) on the radio signals received via antenna 201 and outputs the obtained received signals to reception processing section 203.

Reception processing section 203 extracts configuration information (TP candidate information, paging subframe information), assignment control information, trigger information and data signals included in the received signals. Reception processing section 203 outputs the allocation control information to transmission control section 207 and outputs the configuration information and trigger information to CSI generating section 206. Moreover, reception processing section 203 performs error detection processing on the extracted data signals and outputs ACK/NACK information in accordance with the result of error detection to data signal generating section 205. In addition, reception processing section 203 extracts reference signals (e.g., CSI-RS) transmitted from a plurality of TPs respectively from the received signals based on the TP candidate information in the configuration information and outputs the reference signals to CSI generating section 206.

Upon receipt of an instruction to generate a reference signal (e.g., sounding reference signal (SRS)) from transmission controlling section 207, reference signal generating section 204 generates and outputs reference signals (SRS) to transmission signal forming section 208.

Data signal generating section 205 receives the ACK/NACK information and transmission data and generates data signals by encoding and modulating the ACK/NACK information and transmission data on the basis of MCS information received from transmission controlling section 207. For non-MIMO transmission, data signals are generated using a single codeword (CW) while data signals are generated using two code words for MIMO transmission. It should be noted that data signal generating section 205 also performs CP removal processing and FFT processing when the received signals are OFDM signals.

Figure 5:
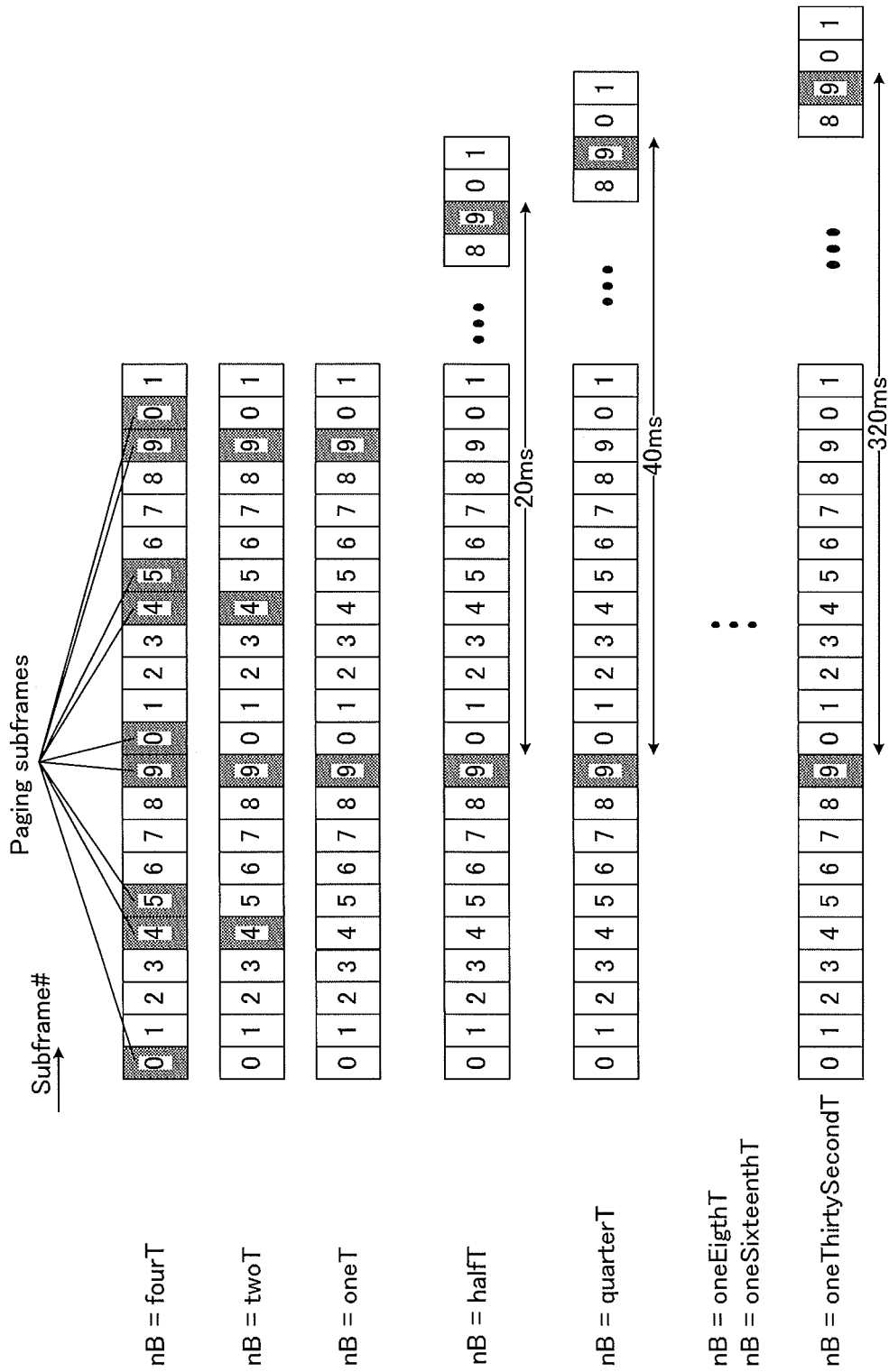
FIG. 5 illustrates a configuration example of paging subframe according to FDD.
Figure 6:
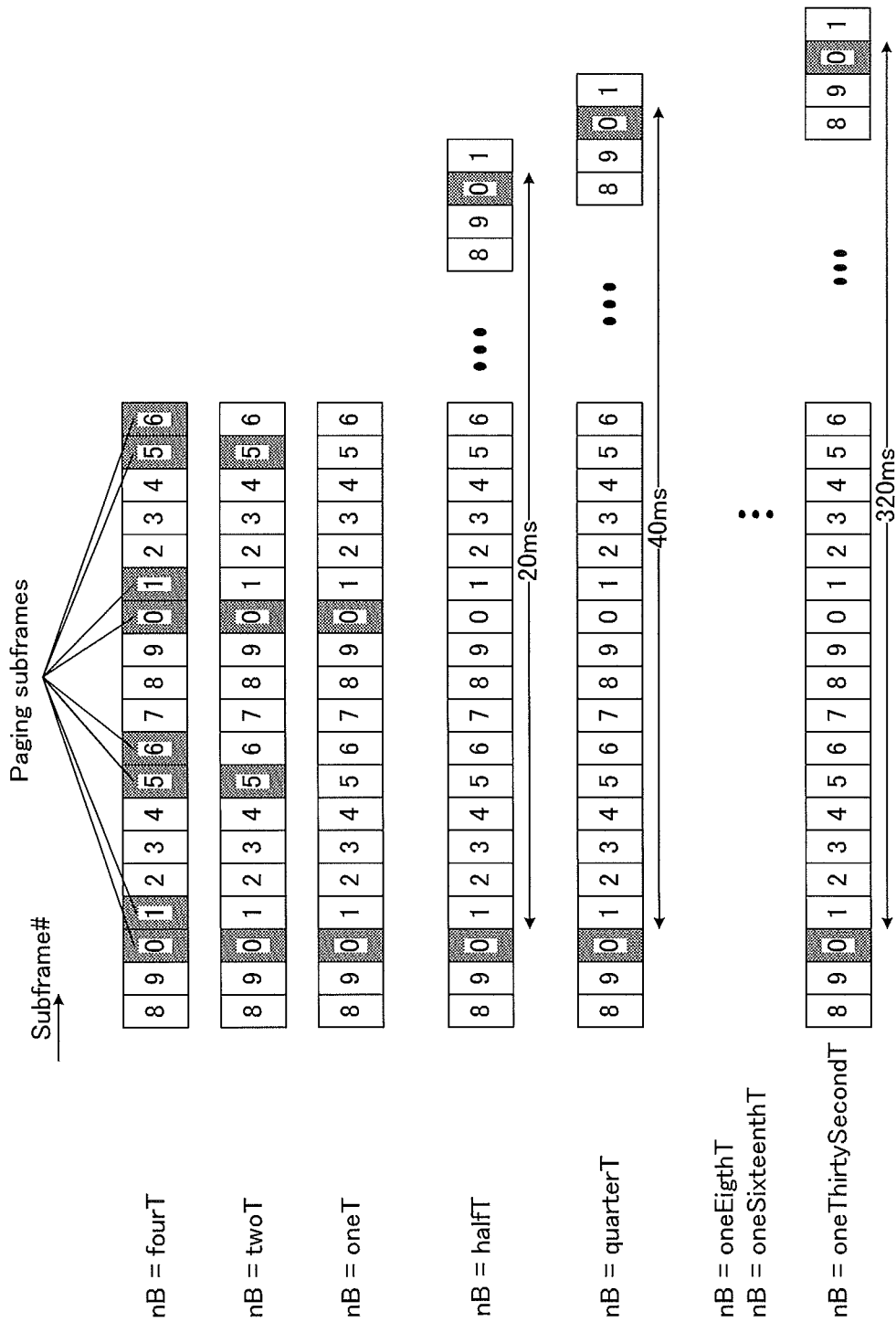
FIG. 6 illustrates a configuration example of paging subframe according to TDD.

CSI generating section 206 generates CSI (channel information) based on TP candidate information, paging subframe information and trigger information. More specifically, CSI generating section 206 identifies a subframe in which CSI generation (CSI reporting) is not performed based on the paging subframes (that is, timings of Drop) configured for the plurality of TPs respectively. The subframe in which CSI generation is not performed is made up of, for example, paging subframes configured in the plurality of TPs. For example, paging subframes of the plurality of TPs are each configured with a predetermined frequency (set value nB) as shown in FIG. 5 (or FIG. 6). As shown in FIG. 5, a paging subframe in which set value nB with a low frequency is configured constitutes a paging subframe in which a higher frequency than set value nb is configured. Thus, CSI generating section 206 may also identify a paging subframe configured with the highest frequency among paging subframes configured in the plurality of TPs respectively as a subframe in which CSI generation is not performed. CSI generating section 206 generates CSI using CSI-RSs of the plurality of TPs in subframes other than the identified subframe and does not generate CSI in the identified subframe.

When periodic CSI reporting is configured, CSI generating section 206 generates CSI through CSI measurement using CSI-RSs from all TPs included in the TP information. On the other hand, when aperiodic CSI reporting is configured, upon receipt of trigger information corresponding to CSI reporting of all TPs included in the TP information, CSI generating section 206 generates CSI through CSI measurement using CSI-RSs from all TPs included in the TP information.

Transmission controlling section 207 identifies "data mapping resources," to which data signals are mapped, on the basis of the allocation control information to be received from reception processing section 203. Transmission controlling section 207 outputs information about the data mapping resources (hereinafter, may be referred to as "data mapping resource information") to transmission signal forming section 208 and also outputs MCS information included in the allocation control information to data signal generating section 205.

Transmission signal forming section 208 maps the reference signals received from reference signal generating section 204 to the reference signal mapping resources. Transmission signal forming section 208 maps the data signals received from data signal generating section 205 to the data mapping resources indicated by the data mapping resource information. Transmission signal forming section 208 maps the CSI reporting received from CSI generating section 206 to the CSI reporting mapping resources. Transmission signals are generated in the manner described above. It should be noted that, for Non-MIMO transmission, single codeword data signals are assigned to a single layer while two codeword data signals are assigned to a plurality of layers for MIMO transmissions. Meanwhile, when the transmission signals are OFDM signals, transmission signal forming section 208 performs a discrete Fourier transform (DFT) on the data signals and maps the resultant data signals to the data mapping resources. Furthermore, CP is added to the transmission signals thus formed.

Transmitting section 209 performs radio transmission processing (e.g., up-conversion, digital to analog (D/A) conversion, and/or the like) on the transmission signal formed by transmission signal forming section 208 and thereafter transmits the processed signals via antenna 201.

(Operations of Base Station 100 and Terminal 200)

A description will be provided regarding operations of base station 100 and terminal 200 respectively including the abovementioned configurations.

In base station 100, configuration section 101 configures TP candidates for configuration target terminal 200. Configuration section 101 configures paging subframe information indicating a paging subframe of each TP candidate for configuration target terminal 200.

The configuration information including TP candidate information and paging subframe information is indicated from base station 100 to terminal 200 by, for example, RRC signaling. In this way, the TP candidate information and paging subframe information are shared beforehand between base station 100 and terminal 200. Base station 100 indicates, to terminal 200, the TP candidate information and paging subframe information to thereby cause terminal 200 to report CSI of all TPs included in the TP candidates.

Note that base station 100 may also indicate configuration information by including the information in a CQI-Report Config message. Base station 100 may also configure one of periodic CSI reporting and aperiodic CSI reporting in CSI reporting target terminal 200 and indicate the configured information by including the information in a CQI-Report Config message.

On the other hand, in terminal 200, CSI generating section 206 generates a CSI report at each report timing based on configuration information (TP candidate information, paging subframe information) and trigger information. More specifically, CSI generating section 206 measures CSI of all TP candidates indicated in TP candidate information at each report timing and generates CSI.

Here, the above-described report timing refers to timings resulting from excluding timings corresponding to the paging subframe of each TP candidate (subframe in which TP executes Drop) from transmission timings configured in CSI reports of all TP candidates in the case of periodic CSI reporting and trigger timings corresponding to CSI reporting of all TP candidates in the case of aperiodic CSI reporting. That is, CSI generating section 206 stops reporting of CSI of all TP candidates at report timing corresponding to the paging subframe indicated in the paging subframe information of each TP candidate.

On the other hand, in base station 100, reception processing section 108 receives a CSI report at each report timing knowing that no CSI report is transmitted from terminal 200 in a subframe corresponding to the paging subframe indicated in the paging subframe information of each TP.

In this way, base station 100 indicates, to terminal 200, not only the paging subframe of the TP to which terminal 200 is connected but also paging subframes (that is, timing of Drop) of a plurality of TPs. This allows terminal 200 to also identify paging subframes of TPs other than the TP to which terminal 200 is connected (TP candidate corresponding to PCell). Terminal 200 stops CSI reporting at timing at which a paging subframe is configured in one of TP candidates. That is, terminal 200 excludes reporting of CSI measured during Drop of a certain TP (CSI shown in FIG. 9 (Drop period)).

Figure 7:
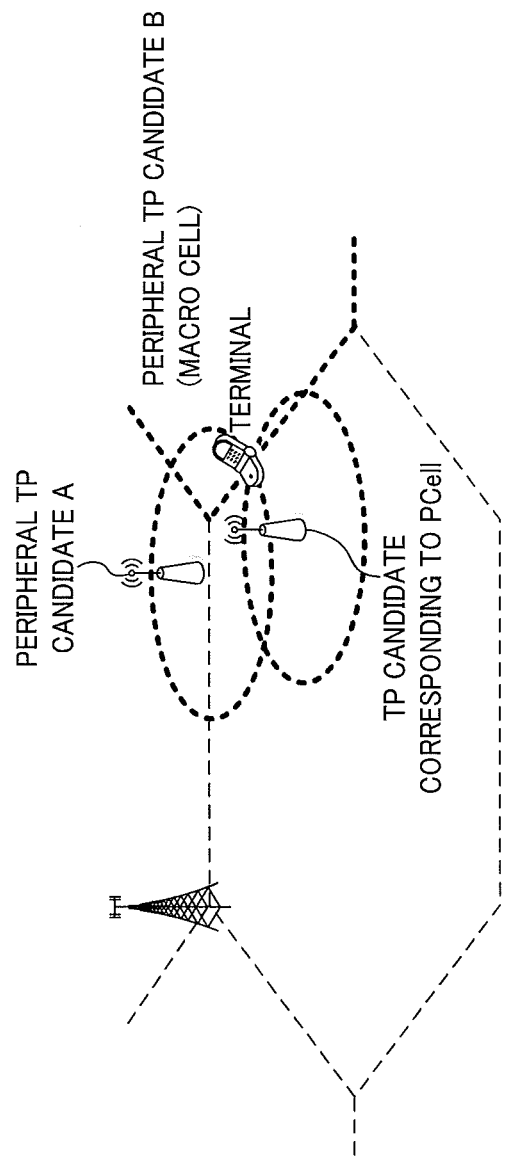
FIG. 7 illustrates an example of TP candidates that can be targets of CoMP control.
Figure 8:
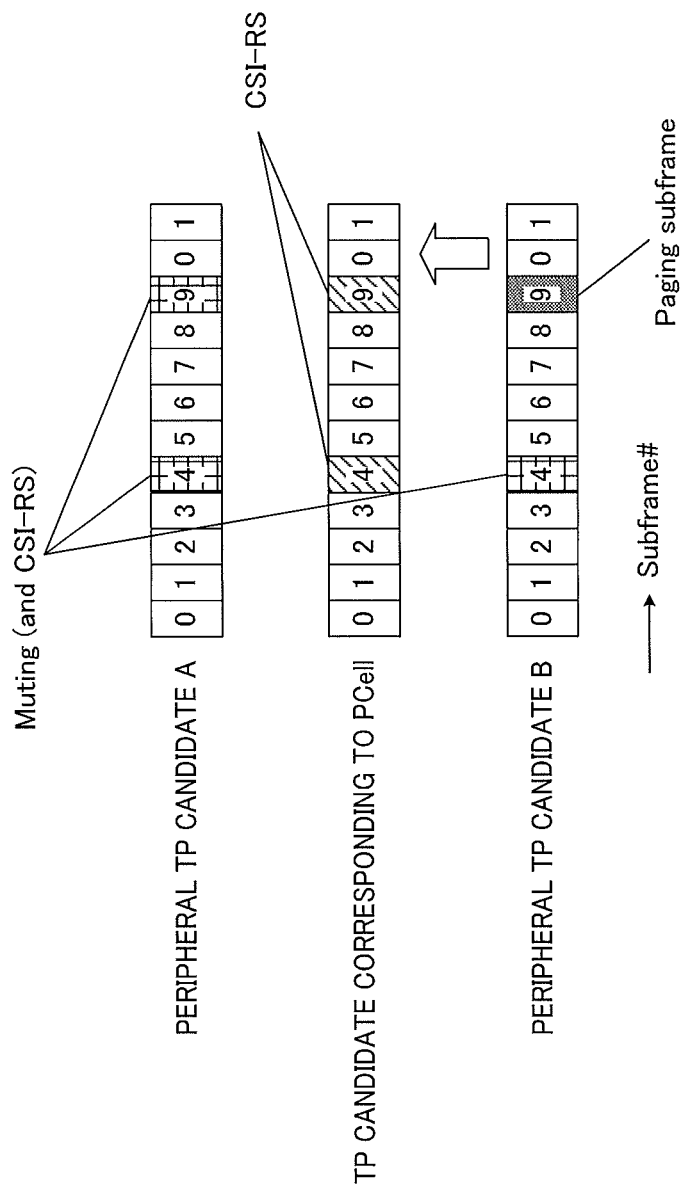
FIG. 8 illustrates a configuration example of subframes of each TP candidate.

For example, a case will be described where a TP candidate corresponding to PCell shown in FIG. 7 (pico cell, nB=halfT), peripheral TP candidate A (pico cell, nB=halfT) and peripheral TP candidate B (macro cell, nB=oneT) are indicated in the TP candidate information.

In this case, CSI generating section 206 identifies a subframe in which CSI generation is stopped based on the paging subframe configured for each TP candidate. For example, in FIG. 14, CSI generating section 206 designates paging subframe (subframe #9) of peripheral TP candidate B (nB=oneT) for which a paging subframe is configured most often (shortest period) as the subframe in which CSI generation is stopped. That is, the subframes in which CSI generation is stopped are made up of paging subframes configured in a plurality of TPs (TP candidate corresponding to PCell, peripheral TP candidate A and peripheral TP candidate B).

Figure 14:
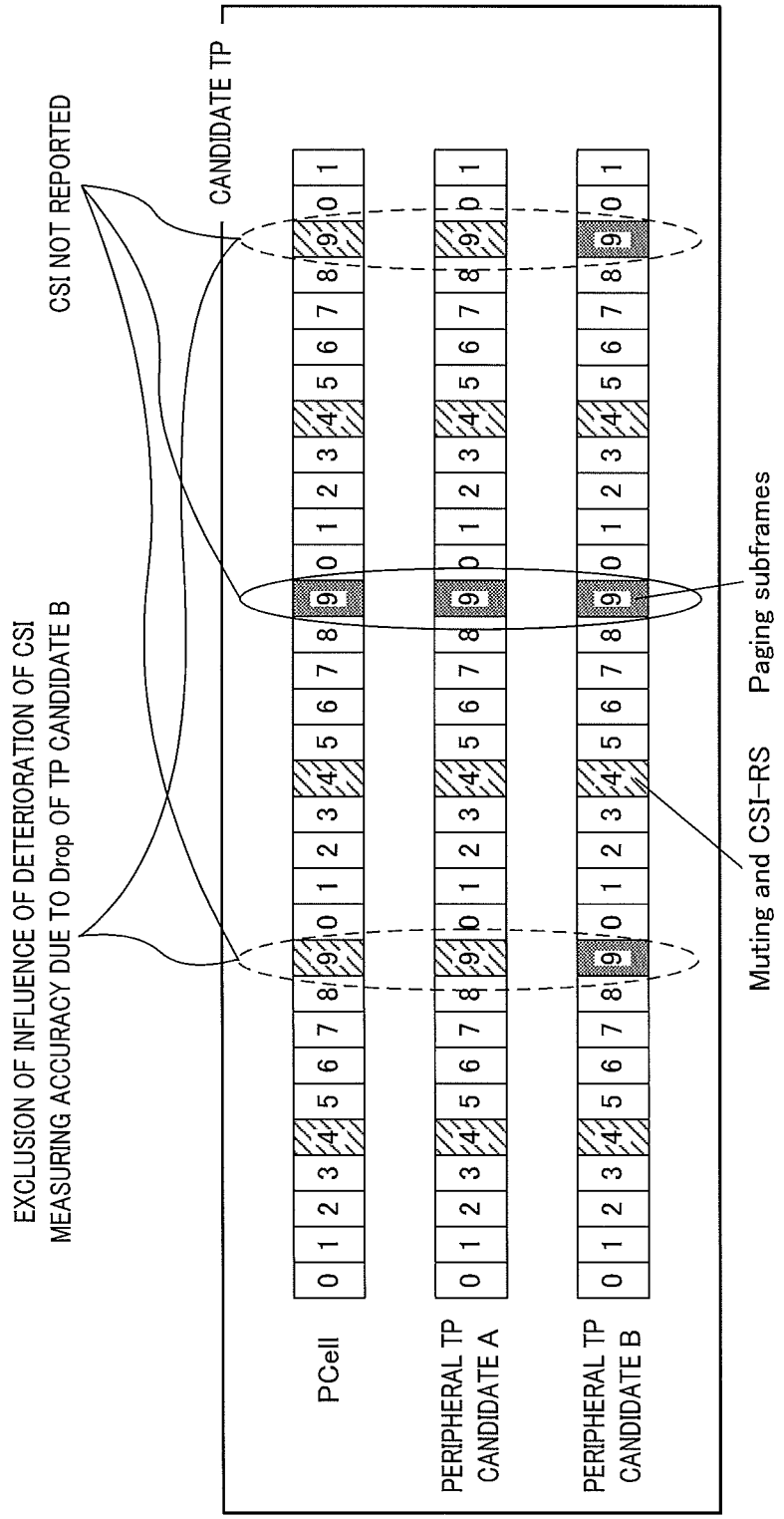
FIG. 14 is a diagram provided for describing CSI reporting according to Embodiment 1 of the present invention.

Here, in subframe #9 enclosed by broken-line ellipses shown in FIG. 14, paging subframes are configured only in peripheral TP candidate B and CSI-RS transmission and muting are not applied thereto. For this reason, in the subframes, CSI generating section 206 may generate CSI whose measuring accuracy has deteriorated due to interference caused by a signal transmitted from peripheral TP candidate B (influence of Drop). In contrast, as shown in FIG. 14, terminal 200 does not perform CSI reporting in a paging subframe of each TP, and can thereby exclude CSI whose measuring accuracy may deteriorate and report normally measured CSI to base station 100.

Thus, base station 100 can appropriately perform CoMP control or the like using CSI reported from terminal 200. That is, base station 100 can apply CoMP control by excluding the influence of deterioration of CSI measuring accuracy caused by Drop. Thus, according to the present embodiment, it is possible to prevent deterioration of throughput by securing accuracy of CSI measurement results in terminal 200. Moreover, according to the present embodiment, it is possible to reduce power consumption associated with CSI reporting operation with poor measuring accuracy.

Conventionally, base station 100 stores paging subframe information for each TP candidate beforehand, and indicates, to terminal 200, only paging subframe information of a TP candidate (PCell) to which terminal 200 is connected. In contrast, in the present embodiment, base station 100 configures information of one paging subframe in each TP candidate for terminal 200. Thus, according to the present embodiment, existing paging subframe information stored beforehand as paging subframe information for each TP candidate can be used.

[Embodiment 2]

Since a base station and a terminal according to the present embodiment have basic configurations common to those of base station 100 and terminal 200 according to Embodiment 1, the base station and terminal will be described with reference to FIGS. 12 and 13.

In base station 100 according to the present embodiment, configuration section 101 generates "partial TP information" indicating at least one or some transmission points among a plurality of TP candidates included in TP candidate information for CSI reporting target terminal 200 in addition to the operation of Embodiment 1. For example, configuration section 101 configures TPs (CoMP measurement set) to be targets of CoMP control among a plurality of TP candidates as the TPs included in the partial TP information. Configuration section 101 generates paging subframe information for each TP included in the partial TP information for CSI reporting target terminal 200.

As described above, partial TP information generated by configuration section 101, TP candidate information similar to that in Embodiment 1 and paging subframe information are subjected to transmission processing as configuration information in coding and modulation section 102, transmission processing section 104, and transmitting section 105, and then transmitted to CSI reporting target terminal 200.

Information of radio resource control (RRC signaling) may be used as control information for indicating TP candidate information, partial TP information and paging subframe information.

Figure 15:
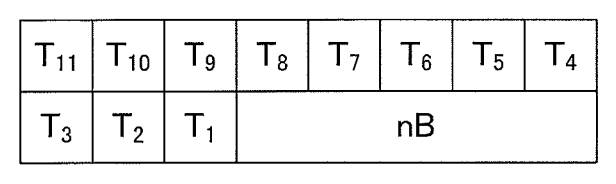

Partial TP information and paging subframe information may also be indicated using a MAC control element (MAC CE). In MAC CE, control information is embedded as a header to be added in the MAC layer. In this case, whether or not each TP corresponds to one of some transmission points may be indicated using a bitmap corresponding to each TP. That is, the "partial TP information" indicating some TPs (base stations) is bitmap-type information that indicates which of a plurality of TP candidates are the some TPs. More specifically, FIG. 15 illustrates bitmaps each corresponding to $T_i$ indicating 11 TPs of index i=1 to 11. In FIG. 15, when the bit of TP index i indicating $T_i$ is '1,' this means that TP corresponding to $T_i$ corresponds to one of some transmission points and when the bit of TP index i is '0,' this means that TP corresponding to $T_i$ is not one of some transmission points.

The MAC CE shown in FIG. 15 indicates set value "nB" of the paging subframe applied to some TPs (the bit of TP index i is '1').

Configuration section 101 may change a combination of TPs included in the partial TP information (e.g., combination of TPs corresponding to '1' in the bitmap in FIG. 15) according to the situation. For example, suppose poor CSI is reported for a certain TP when CSI reporting based on the partial TP information is received. In this case, base station 100 may delete the TP from the "partial TP information" and add other TPs to the partial TP information. In other words, base station 100 may add a TP with better CSI to the "partial TP information." Alternatively, when the physical distance between a TP included in the partial TP information and terminal 200 is estimated to have increased, base station 100 may delete the TP from the partial TP information in the same as the above-described case. When the combination of TPs included in the partial TP information is changed, base station 100 may indicate, to terminal 200, the changed combination at optional timing using MAC CE.

Reception processing section 108 identifies a resource to which CSI reporting is mapped based on TP candidate information received from configuration section 101, configuration information including partial TP information and paging subframe information and trigger information, and extracts signal components mapped to the identified resources from the received signals. More specifically, in a paging subframe indicated in the paging subframe information corresponding to a TP candidate indicated in the partial TP information, reception processing section 108 determines that no CSI report is transmitted from terminal 200 and does not perform reception processing on the CSI reporting. That is, the subframe in which CSI generation is not performed is made up of paging subframes configured in some TPs indicated in the partial TP information. On the other hand, in subframes other than the paging subframe indicated in the paging subframe information corresponding to a TP candidate included in the partial TP information, reception processing section 108 receives a CSI report using the identified resources.

On the other hand, in terminal 200 according to the present embodiment, CSI generating section 206 generates CSI (channel information) based on the TP candidate information, partial TP information, paging subframe information and trigger information. More specifically, CSI generating section 206 identifies a subframe in which CSI generation (CSI reporting) is not performed based on paging subframes (that is, timing of Drop) configured for respective TP candidates indicated in the partial TP information. CSI generating section 206 generates CSI using CSI-RSs of a plurality of TPs in subframes other than the identified subframe and does not generate CSI in the identified subframe.

When periodic CSI reporting is configured, CSI generating section 206 generates CSI through CSI measurement using CSI-RSs from all TPs included in the TP candidate information at timings of CSI reporting of all TPs included in the TP candidate information. CSI generating section 206 generates CSI of some TPs through CSI measurement using CSI-RSs from TPs indicated in partial TP information at timings of CSI reporting of the TPs indicated in the partial TP information.

When aperiodic CSI reporting is configured, upon receiving trigger information corresponding to CSI reporting of all TPs included in the TP candidate information, CSI generating section 206 generates CSI through CSI measurement using CSI-RSs from all TPs included in the TP candidate information. Upon receiving trigger information corresponding to CSI reporting of TPs indicated in the partial TP information, CSI generating section 206 generates CSI through CSI measurement using CSI-RSs from TPs indicated in the partial TP information.

Operations of base station 100 and terminal 200 configured as described above will be described.

Figure 16:
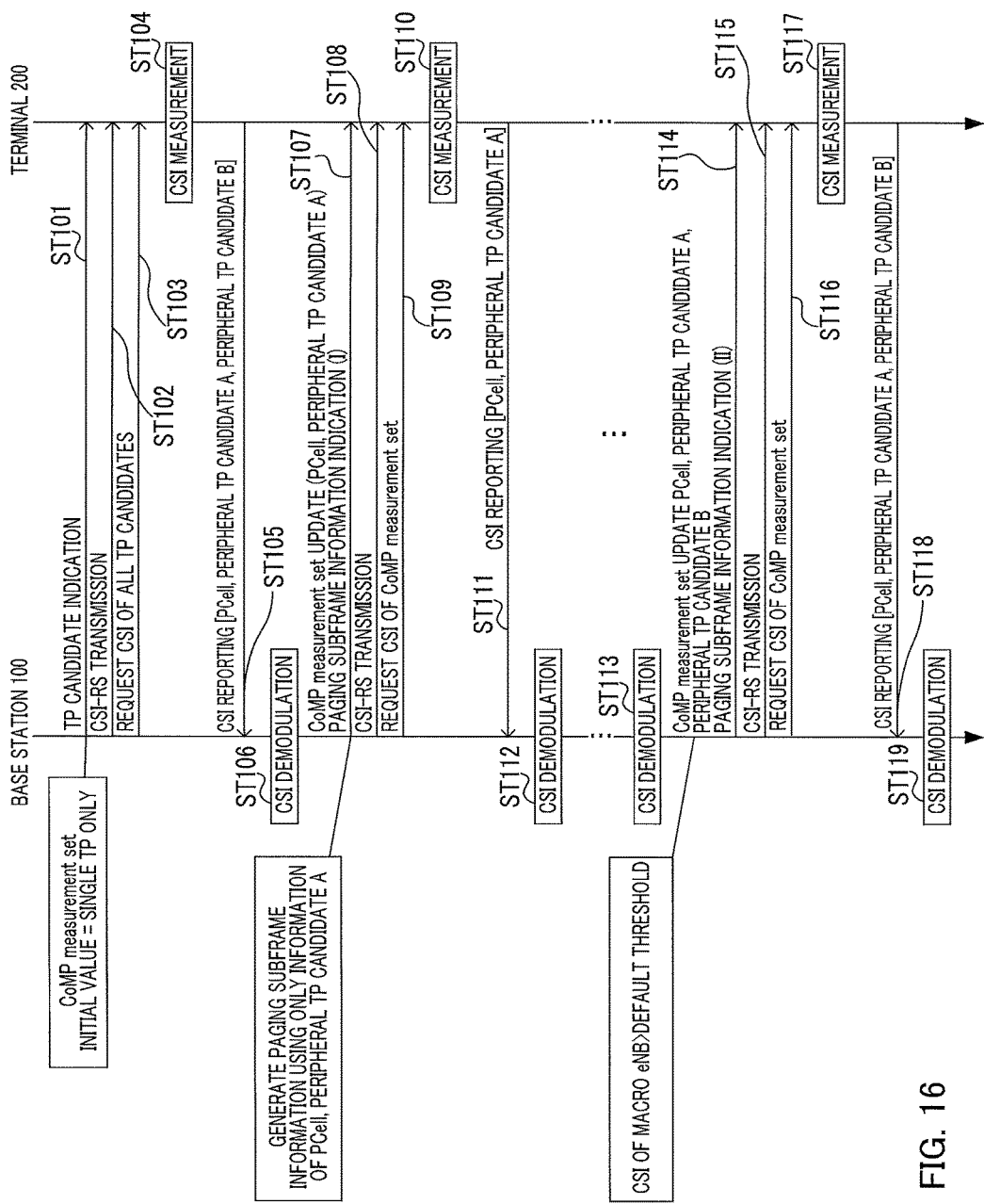
FIG. 16 is a sequence diagram illustrating processing of a base station and a terminal according to Embodiment 2 of the present invention.

FIG. 16 illustrates a sequence diagram showing a processing flow of base station 100 and terminal 200. Here, suppose TPs (TP candidates) to which terminal 200 can be connected in mobility control are three TPs: TP candidate (pico cell) corresponding to PCell, peripheral TP candidate A (pico cell) and peripheral TP candidate B (macro cell) shown in FIG. 7.

Base station 100 configures a certain single TP as an initial value of CoMP measurement set. For example, the single TP configured as the initial value of CoMP measurement set is assumed to be a TP that performs processes in steps (hereinafter referred to as "ST") 101 to ST105 (which will be described later) with terminal 200 (TP that transmits/receives downlink control signals to/from terminal 200, that is, a TP candidate corresponding to PCell). As the initial value of the "partial TP information" shown in FIG. 16, base station 100 configures TP index i corresponding to the single TP as '1' and TP index i corresponding to other TPs as '0.' The partial TP information expressed by such a bitmap is indicated from base station 100 to terminal 200 beforehand through MAC CE (e.g., see FIG. 15).

In FIG. 16, in ST101, base station 100 indicates the TP candidate information to terminal 200. Here, base station 100 includes the TP candidate corresponding to PCell, peripheral TP candidate A and peripheral TP candidate B as TP candidates. This TP candidate information is indicated from base station 100 to terminal 200 through a radio resource control message (RRC signaling) Base station 100 may indicate configuration information by including the information in a CQI-ReportConfig message. Base station 100 may also configure which of periodic CSI reporting or aperiodic CSI reporting is applicable to CSI reporting target terminal 200 and indicate the configured information by including the information in a CQI-ReportConfig message.

In ST102, base station 100 transmits the CSI-RS configured in base station 100 to terminal 200.

In ST103, base station 100 requests CSI reporting of all TP candidates from terminal 200.

Upon receiving the CSI reporting request in ST103, in ST104, terminal 200 performs CSI measurement for all TP candidates indicated in the TP candidate information received in ST101 (TP candidate corresponding to PCell, peripheral TP candidate A, peripheral TP candidate B) using a plurality of CSI-RSs transmitted from each TP including the CSI-RS received in ST102 That is, terminal 200 generates CSI for each of a plurality of CSI-RSs transmitted from a plurality of TPs based on the TP candidate information.

In ST105, terminal 200 reports the CSI measured in ST104 (CSI of TP candidate corresponding to PCell, peripheral TP candidate A, peripheral TP candidate B) to base station 100.

In ST106, base station 100 demodulates the CSI received in ST105. This CSI is used, for example, for mobility control.

For example, of CSIs of the TP candidate corresponding to PCell, peripheral TP candidate A and peripheral TP candidate B demodulated in ST106, suppose CSIs of the TP candidate corresponding to PCell and peripheral TP candidate A are favorable, whereas CSI of peripheral TP candidate B is poor. In this case, base station 100 configures two TPs of the TP candidate corresponding to PCell and peripheral TP candidate A as the CoMP measurement set. That is, base station 100 includes the two TPs of the TP candidate corresponding to PCell and peripheral TP candidate A in the partial TP information. That is, as the CSI reporting targets, some limited TPs (partial TP information) are defined as the CoMP measurement set to be used for CoMP control (transmission points as the target of CoMP control) and CSI reporting requests for these TPs are expressed as operations for requesting CSI reporting of the CoMP measurement set.

Base station 100 generates paging subframe information indicating paging subframes configured in TP candidates (TP candidate corresponding to PCell and peripheral TP candidate A) indicated in the partial TP information respectively for terminal 200. That is, base station 100 does not generate paging subframe information configured in peripheral TP candidate B for terminal 200.

In ST107, base station 100 indicates, to terminal 200, this updated partial TP information (that is, update of CoMP measurement set) and paging subframe information through MAC CE (e.g., see FIG. 15).

In ST108 as well as ST102, the base station transmits the CSI-RS configured in the base station to terminal 200. In ST109, base station 100 requests CSI reporting of CoMP measurement set from terminal 200. That is, base station 100 requests CSI reporting of a TP in partial TP information which is the CSI reporting target from terminal 200.

Upon receiving the CSI reporting request in ST109, in ST110, terminal 200 performs CSI measurement for the TP candidate (TP candidate corresponding to PCell, peripheral TP candidate A) indicated as the CSI reporting target in the partial TP information received in ST108 using the CSI-RS transmitted from each TP including the CSI-RS received in ST108. In this case, terminal 200 does not perform CSI reporting at a timing corresponding to a paging subframe indicated in the paging subframe information indicated in ST107 among the report timings of TP candidates (TP candidate corresponding to PCell, peripheral TP candidate A) indicated in the partial TP information as CSI reporting targets.

More specifically, as shown in FIG. 17A, terminal 200 does not generate CSI in the paging subframes (subframes #9 enclosed by a solid line ellipse) of the TP candidate corresponding to PCell and peripheral TP candidate A which are TP candidates indicated in the partial TP information (CSI reporting targets) among the TP candidate corresponding to PCell, peripheral TP candidate A, peripheral TP candidate B which are TP candidates shown in the TP candidate information. Thus, terminal 200 receives paging subframe information for each TP shown in partial TP information and identifies subframes in which CSI generation is not performed, based on the paging subframe information.

That is, as shown in FIG. 17A, terminal 200 does not consider timings (subframe #9 enclosed by ellipse of single-dot dashed line) corresponding to paging subframes with only a TP candidate other than CSI reporting targets (peripheral TP candidate B). That is, terminal 200 also generates a CSI report at timings (subframes #9 enclosed by an ellipse of single-dot dashed line) at which paging subframes are configured with only peripheral TP candidate B in FIG. 17A. In subframes #9 enclosed by single-dot dashed line ellipses shown in FIG. 17A, CSI-RS transmission and muting are not applied due to Drop in peripheral TP candidate B, and paging or a data signal may be transmitted. However, since the CSI reported in ST106 is poor, the influence of interference caused by the signal transmitted from peripheral TP candidate B is extremely small in terminal 200. Thus, in subframes #9 enclosed by single-dot dashed line ellipses shown in FIG. 17A, terminal 200 can generate CSI while avoiding the influence of Drop in peripheral TP candidate B.

In ST111, terminal 200 reports CSI (TP candidate corresponding to PCell, peripheral TP candidate A) measured in ST110 to base station 100.

In ST112, base station 100 demodulates the CSI received in ST111. This CSI is used for CoMP control, for example.

Hereinafter, base station 100 requests CSI reporting of CoMP measurement set with frequency necessary for CoMP control. Furthermore, base station 100 also requests CSI reporting for all TPs with frequency less than that of CSI reporting request of CoMP measurement set.

As shown in FIG. 16, it is assumed that the CSI of peripheral TP candidate B demodulated in ST113 becomes greater than a predetermined value (threshold) and that base station 100 detects that the receiving quality of a signal arriving from peripheral TP candidate B at terminal 200 has improved. In this case, base station 100 updates the CoMP measurement set (that is, partial TP information). That is, base station 100 may add peripheral TP candidate B to CoMP measurement set (partial TP information). Base station 100 generates paging subframe information indicating paging subframes configured in TP candidates (TP candidate corresponding to PCell, peripheral TP candidate A, peripheral TP candidate B) indicated in the partial TP information for terminal 200. In ST114, base station 100 indicates, to terminal 200, this updated partial TP information (that is, update of CoMP measurement set) and paging subframe information through MAC CE (e.g., see FIG. 15).

In ST115, base station 100 transmits CSI-RS configured in base station 100 to terminal 200 as in the case of ST102. In ST116, base station 100 requests CSI reporting of CoMP measurement set from terminal 200. In ST117, terminal 200 performs CSI measurement for TP candidates (TP candidate corresponding to PCell, peripheral TP candidate A, peripheral TP candidate B) indicated as CSI reporting targets in the partial TP information received in ST116 using CSI-RS transmitted from each TP including the CSI-RS received in ST115. In this case, terminal 200 does not perform CSI reporting at a timing corresponding to a paging subframe indicated in the paging subframe information indicated in ST114 among reporting timings of TP candidates (TP candidate corresponding to PCell, peripheral TP candidate A, peripheral TP candidate B) indicated as CSI reporting targets in the partial TP information.

More specifically, as shown in FIG. 17B, terminal 200 does not generate CSI in paging subframes (subframes #9 enclosed by ellipses of solid line and broken line) of the TP candidate corresponding to PCell which is a TP candidate (CSI reporting target) indicated in the partial TP information, peripheral TP candidate A and peripheral TP candidate B. That is, terminal 200 does not generate any CSI report at timings (subframes #9 enclosed by broken-line ellipses) at which paging subframes are configured with only peripheral TP candidate B in FIG. 17B either. Since CSI of peripheral TP candidate B obtained in ST113 is favorable, the influence of interference caused by the signal transmitted from peripheral TP candidate B on terminal 200 is considered large. Thus, in subframes #9 enclosed by broken-line ellipses shown in FIG. 17B, terminal 200 does not generate CSI in order to exclude the influence of deterioration of CSI measuring accuracy due to Drop in peripheral TP candidate B.

In ST118, terminal 200 reports the CSI (CSI of TP candidate corresponding to PCell, peripheral TP candidate A, peripheral TP candidate B) measured in ST117 to base station 100. In ST119, base station 100 demodulates the CSI received in ST118.

Base station 100 and terminal 200 will repeat the above-described processing hereinafter.

In this way, upon determining that the combination of some TPs (here, TPs to be targets of CSI reporting) needs to be changed, base station 100 adds or deletes corresponding TPs to/from the some TPs. For example, an example of the case where the combination of some TPs (here TPs to be targets of CSI reporting) needs to be changed is a case where when base station 100 receives CSI of all TPs, CSI better than a predetermined threshold is reported and terminal 200 is assumed to have moved to a position physically close to the TP corresponding to the CSI.

Thus, base station 100 uses a plurality of TPs which become candidates for mobility control for terminal 200 using control such as RRC signaling without changing them for a long time and reports only CSI of some TPs (e.g., CoMP control target) among the plurality of TPs to terminal 200, and thereby updates partial TP information and paging subframe information corresponding to the partial TP information.

Moreover, when changing a combination of some TPs, base station 100 indicates, to terminal 200, paging subframe information indicating paging subframes of respective TPs. By so doing, it is possible to update partial TP information and paging subframes corresponding to the TPs included in the partial TP information simultaneously.

To avoid the influence of Drop (CSI-RS transmission and muting are not applied) on deterioration of CSI measuring accuracy, terminal 200 stops CSI reporting only in paging subframes in TPs (some TPs) which are CSI reporting targets. In other words, terminal 200 performs CSI reporting even in paging subframes with only TPs other than the CSI reporting targets (TPs other than some TPs). Regarding the TPs other than the CSI reporting targets, since CSI in terminal 200 is poor, even when the TP transmits a signal due to Drop, the influence of the interference received by terminal 200 is extremely small.

For example, when compared to Embodiment 1 (FIG. 14), in FIG. 17A, terminal 200 performs CSI reporting even at timings (portions enclosed by broken lines shown in FIG. 17A) at which paging subframes are configured only in TPs other than the CSI reporting targets (TPs other than some TPs), and the number of times CSI reporting is performed increases accordingly. Thus, even when TPs having a high paging subframe configuring frequency are included as TP candidates, subframes in which CSI reporting is not performed is limited to only paging subframes of some TPs.

By so doing, the present embodiment can widely secure TP candidates (candidates for mobility control) to which terminal 200 can be connected and at the same time limit detailed CSI reporting target TPs and paging subframes in which CSI reporting is stopped to only some TPs (targets of CoMP control). By so doing, it is possible to reduce the frequency with which CSI reporting to avoid the influence of Drop on the deterioration of CSI measuring accuracy.

When a TP included in some TPs is updated, base station 100 reports partial TP information using MAC CE, and can thereby indicate the partial TP information to terminal 200 at an optional timing.

Terminal 200 can exclude CSI whose measuring accuracy has deteriorated and report the normally measured CSI to base station 100 as in the case of Embodiment 1. Thus, base station 100 can exclude the influence of deterioration of CSI measuring accuracy due to no application of CSI-RS transmission or muting in a paging subframe of each TP, and apply CoMP control. Thus, according to the present embodiment, it is possible to secure the accuracy of a CSI measurement result in terminal 200 and prevent throughput deterioration.

Base station 100 (configuration section 101) may use CSI reporting of all TPs included in TP candidate information to determine a combination of TPs included in partial TP information. More specifically, base station 100 may determine several (predetermined number of) best CSI TPs according to CSI reports of all TPs included in TP candidate information as a combination of TPs included in the partial TP information. That is, TPs included in the partial TP information are a predetermined number of TPs with better CSI among a plurality of TPs.

The present embodiment has been described with a case where base station 100 generates paging subframe information corresponding to the partial TP information together with the partial TP information and indicates the paging subframe information to terminal 200. However, base station 100 may indicate, to terminal 200, beforehand, paging subframe information of the plurality of TPs included in the TP candidate information and terminal 200 may identify a subframe in which CSI reporting is not performed using paging subframe information indicated beforehand every time terminal 200 receives partial TP information. That is, terminal 200 may designate paging subframes corresponding to some TPs indicated in the partial TP information among paging subframes indicated in paging subframe information stored beforehand as subframes in which CSI reporting is not performed every time terminal 200 receives partial TP information. This configuration eliminates the necessity for base station 100 to add control information (paging subframe information) separately in addition to the partial TP information when updating the partial TP information and allows terminal 200 to update the paging subframe information.

In the present embodiment, base station 100 may indicate, to terminal 200, paging subframe information of each TP included in TP candidate information beforehand and terminal 200 may generate paging subframe information in accordance with a long-period average value (RSRP (Reference Signal Reception Power)) of received signal power separately reported from terminal 200. RSRP is measured using CRS, for example. More specifically, terminal 200 generates paging subframe information targeting TPs having RSRP values included within a predetermined threshold from maximum RSRP among TPs included in TP candidates. That is, terminal 200 may designate paging subframes corresponding to TPs whose RSRP value is equal to or above a threshold as subframes in which CSI reporting is not performed among paging subframes of a plurality of TPs indicated in the paging subframe information indicated beforehand. That is, terminal 200 identifies some TPs which become targets of exclusion of the influence of deterioration of CSI measuring accuracy due to Drop in paging subframes based on RSRP. This configuration allows subframes in which CSI reporting is not performed to be updated without adding separate control information to indicate the above-described some TPs. Although a case has been described where a long-period average value (RSRP value calculated using CRS) is used as a reference, the reference is not limited to this, and a wideband CQI value used to report CSI of all TPs may be used as a reference. This allows an operation using CSI-RSs for which RSRP measurement is not defined while using the conventional definition of RSRP measurement.

A case has been described in the present embodiment where TP candidates indicated in partial TP information (that is, targets of generation of paging subframe information) is the same as TPs of targets of CoMP control (CoMP measurement set, that is, CSI reporting targets). However, TPs indicated in partial TP information may be configured so as to be different (at least partially different) from TPs that become targets of CoMP control. Adopting this configuration enables an operation in which TPs with less influence of Drop on CSI measurement may be CSI reporting targets, but may not be included in targets of generation of paging subframe information (that is, some TPs). By so doing, TPs with high frequency of Drop may be excluded from targets of generation of paging subframe information and thus more easily included in CSI reporting targets.

Each embodiment of the present invention has been described thus far.

[Other Embodiments]

(1) In each of the embodiments described above, the term "antenna port" refers to a logical antenna including one or more physical antennas. In other words, the term "antenna port" does not necessarily refer to a single physical antenna, and sometimes refers to an array antenna including a plurality of antennas, for example.

For example, in 3GPP LTE, how many physical antennas are included in the antenna port is not defined, but the antenna port is defined as the minimum unit allowing the base station to transmit a different reference signal.

In addition, an antenna port may be specified as a minimum unit to be multiplied by a precoding vector weighting.

(2) In each of the embodiments described above, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

A terminal according to this disclosure includes: a receiving section that receives reference signals transmitted from a plurality of transmission points, respectively; a generating section that identifies, based on first subframes configured respectively for the plurality of transmission points, a second subframe, that generates channel information using the reference signals of the plurality of transmission points in a subframe other than the second subframe, and that does not generate the channel information in the second subframe; and a transmitting section that transmits the generated channel information.

In the terminal according to this disclosure, the second subframe includes the first subframes configured at the plurality of transmission points.

In the terminal according to this disclosure, the second subframe includes only the first subframe configured in at least one or some of the plurality of transmission points.

In the terminal according to this disclosure, the receiving section receives information indicating the first subframe for each of the plurality of transmission points; and the generating section identifies the second subframe based on the information.

In the terminal according to this disclosure, the receiving section receives information indicating the first subframe for each of the some transmission points; and the generating section identifies the second subframe based on the information.

In the terminal according to this disclosure, the receiving section receives first information indicating the first subframes of the plurality of transmission points and receives second information indicating the some transmission points; and the generating section designates, every time the second information is received, subframes corresponding to the some transmission points indicated in the second information among the first subframes indicated in the first information as the second subframes.

In the terminal according to this disclosure, the receiving section receives information indicating the first subframes of the plurality of transmission points; and the generating section designates subframes corresponding to transmission points where received signal power is equal to or above a threshold among the first subframes indicated in the information as the second subframes.

In the terminal according to this disclosure, the some transmission points are at least partially different from transmission points which become control targets of coordinated transmission by a plurality of transmission points.

In the terminal according to this disclosure, the some transmission points are transmission points among the plurality of transmission points which become control targets of coordinated transmission by the plurality of transmission points.

In the terminal according to this disclosure, the information indicating the some transmission points is bitmap type information indicating which ones of the plurality of transmission points are the some transmission points.

In the terminal according to this disclosure, the some transmission points are transmission points with favorable channel information among the plurality of transmission points.

In the terminal according to this disclosure, the first subframes are subframes in which paging is transmitted.

A base station according to this disclosure includes: a configuration section that configures a plurality of transmission points for a terminal; and a receiving section that identifies, based on first subframes configured for the plurality of transmission points respectively, a second subframe, that receives channel information of the plurality of transmission points in a subframe other than the second subframe, and that does not receive the channel information in the second subframe.

A transmission method according to this disclosure includes: receiving reference signals transmitted from a plurality of transmission points respectively; identifying, based on first subframes configured for the plurality of transmission points, respectively, a second subframe, generating channel information using the reference signals of the plurality of transmission points in a subframe other than the second subframe, and not generating the channel information in the second subframe; and transmitting the generated channel information.

A reception method according to this disclosure includes: configuring a plurality of transmission points for a terminal; and identifying, based on first subframes configured for the plurality of transmission points respectively, a second subframe, receiving channel information of the plurality of transmission points in a subframe other than the second subframe, and not receiving the channel information in the second subframe.

The disclosure of the specification, the drawings, and the abstract included in Japanese Patent Application No. 2012-031656 filed on Feb. 16, 2012 is incorporated herein by reference in their entirety.

INDUSTRIAL APPLICABILITY

The present invention can be applied to mobile communication systems, for example.

REFERENCE SIGNS LIST

100 Base station
101 Configuration section
102, 103 Coding and modulation section
104 Transmission processing section
105, 209 Transmitting section
106, 201 Antenna
107, 202 Receiving section
108, 203 Reception processing section
109 Data receiving section
110 CSI receiving section
200 Terminal
204 Reference signal generating section
205 Data signal generating section
206 CSI generating section
207 Transmission control section
208 Transmission signal forming section

The invention claimed is:
1. A terminal comprising:
a receiver, which, in operation, receives reference signals transmitted from a plurality of transmission points, respectively;
a channel information generator, which, in operation, identifies, based on first subframes set respectively for the plurality of transmission points, a second subframe, generates channel information using the reference signals of the plurality of transmission points in a subframe other than the second subframe, and does not generate the channel information in the second subframe; and a transmitter, which, in operation, transmits the generated channel information, wherein the second subframe comprises the first subframe set for at least one of the plurality of transmission points.

2. The terminal according to claim 1, wherein the second subframe comprises the first subframes set for the plurality of transmission points.

3. The terminal according to claim 1, wherein the second subframe comprises only the first subframe set for some of the plurality of transmission points.

4. The terminal according to claim 3, wherein:
the receiver, in operation, receives information indicating the first subframe for each of the some transmission points; and
the channel information generator, in operation, identifies the second subframe based on the information.

5. The terminal according to claim 3, wherein:
the receiver, in operation, receives first information indicating the first subframes of the plurality of transmission points and receives second information indicating the some transmission points; and
the channel information generator, in operation, designates, every time the second information is received, subframes corresponding to the some transmission points indicated in the second information among the first subframes indicated in the first information as the second subframes.

6. The terminal according to claim 3, wherein the some transmission points are at least partially different from transmission points which become control targets of coordinated transmission by a plurality of transmission points.

7. The terminal according to claim 3, wherein the some transmission points are transmission points among the plurality of transmission points which become control targets of coordinated transmission by the plurality of transmission points.

8. The terminal according to claim 3, wherein information indicating the some transmission points is bitmap type information indicating which ones of the plurality of transmission points are the some transmission points.

9. The terminal according to claim 3, wherein the some transmission points are transmission points with favorable channel information among the plurality of transmission points.

10. The terminal according to claim 1, wherein:
the receiver, in operation, receives information indicating the first subframe for each of the plurality of transmission points; and
the channel information generator, in operation, identifies the second subframe based on the information.

11. The terminal according to claim 1, wherein:
the receiver, in operation, receives information indicating the first subframes of the plurality of transmission points; and
the channel information generator, in operation, designates subframes corresponding to transmission points where received signal power is equal to or above a threshold among the first subframes indicated in the information as the second subframes.

12. The terminal according to claim 1, wherein the first subframes are subframes in which paging is transmitted.

13. A base station comprising:
configuration circuitry, which, in operation, configures a plurality of transmission points for a terminal; and
receiving circuitry, which, in operation, identifies, based on first subframes set for the plurality of transmission points respectively, a second subframe, receives channel information of the plurality of transmission points in a subframe other than the second subframe, and does not receive the channel information in the second subframe, wherein the second subframe comprises the first subframe set for at least one of the plurality of transmission points.

14. A transmission method comprising:
receiving reference signals transmitted from a plurality of transmission points respectively;
identifying, based on first subframes set for the plurality of transmission points, respectively, a second subframe, generating channel information using the reference signals of the plurality of transmission points in a subframe other than the second subframe, and not generating the channel information in the second subframe; and
transmitting the generated channel information,
wherein the second subframe comprises the first subframe set for at least one of the plurality of transmission points.

15. A reception method comprising:
configuring a plurality of transmission points for a terminal; and
identifying, based on first subframes set for the plurality of transmission points respectively, a second subframe, receiving channel information of the plurality of transmission points in a subframe other than the second subframe, and not receiving the channel information in the second subframe,
wherein the second subframe comprises the first subframe set for at least one of the plurality of transmission points.

* * * * *